United States Patent
Cunningham et al.

(10) Patent No.: US 6,466,880 B2
(45) Date of Patent: Oct. 15, 2002

(54) MASS FLOW MEASUREMENT METHODS, APPARATUS, AND COMPUTER PROGRAM PRODUCTS USING MODE SELECTIVE FILTERING

(75) Inventors: Timothy J. Cunningham, Boulder, CO (US); David Lee Campbell, Boulder, CO (US); Thomas Dean Sharp, Terrace Park, OH (US)

(73) Assignee: Micro Motion, Inc., Boulder, CO (US)

( * ) Notice: Subject to any disclaimer, the term of this patent is extended or adjusted under 35 U.S.C. 154(b) by 17 days.

(21) Appl. No.: 09/788,189

(22) Filed: Feb. 16, 2001

(65) Prior Publication Data

US 2002/0143481 A1 Oct. 3, 2002

(51) Int. Cl.$^7$ .............................................. G06F 17/60
(52) U.S. Cl. .......................... 702/50; 702/43; 702/189; 702/188; 702/55
(58) Field of Search ........................... 702/50, 45, 189, 702/56, 54, 100; 241/24; 162/198; 73/1.34, 861; 364/575, 558, 570

(56) References Cited

U.S. PATENT DOCUMENTS

| | | |
|---|---|---|
| 4,109,524 A | 8/1978 | Smith |
| 4,491,025 A | 1/1985 | Smith et al. |
| 4,811,606 A | 3/1989 | Hasegawa et al. |
| 5,295,084 A | 3/1994 | Arunachalam et al. |
| 5,307,689 A | 5/1994 | Nishiyama et al. |
| 5,365,794 A | 11/1994 | Hussain et al. |
| 5,485,755 A | 1/1996 | Lew |
| 5,488,870 A | 2/1996 | Yoshimura et al. |
| 5,497,666 A | 3/1996 | Patten et al. |
| 5,531,126 A | 7/1996 | Drahm |
| 5,546,814 A | 8/1996 | Mattar et al. |
| 5,551,307 A | 9/1996 | Kane et al. |
| 5,557,973 A | 9/1996 | Koudal et al. |
| 5,602,345 A | 2/1997 | Wenger et al. |

(List continued on next page.)

OTHER PUBLICATIONS

US 6,044,715, 4/2000, Ollila et al. (withdrawn)
G. Sultan, "Single Straight–Tube Coriolis Mass Flowmeter", Flow Measure Instrument, 1992, pp. 241–246, vol. 3 No. 4, Butterworth–Heinemann Ltd.

(List continued on next page.)

Primary Examiner—John S. Hilten
Assistant Examiner—Tung S Lau
(74) Attorney, Agent, or Firm—Faegre & Benson LLP

(57) ABSTRACT

Mass flow of a material in a conduit is estimated by mode selective filtering a plurality of motion signals representing motion of the conduit to generate a plurality of mode selective filtered motion signals such that the mode selective filtered motion signals preferentially represent motion associated with a vibrational mode of the conduit. A plurality of phase estimates is generated from the plurality of mode selective filtered motion signals. A mass flow estimate is generated from the plurality of phase estimates. The plurality of phase estimates may be estimated using a phase reference derived from one of the plurality of mode selective filtered motion signals. In some embodiments, a frequency of a mode selective filtered motion signal of the plurality of mode selective filtered motion signals is estimated. Quadrature first and second reference signals are generated based on the estimated frequency. The plurality of phase estimates is generated from the plurality of mode selective filtered motion signals and the first and second reference signals. A plurality of time difference estimates may be generated from the plurality of phase estimates, and the mass flow estimate may be generated from the plurality of time difference estimates. The plurality of time difference estimates may be generated from the plurality of phase estimates by dividing the plurality of phase estimates using a mode frequency estimated from the mode selective filtered motion signals. The invention may be embodied as methods, apparatus and computer program products.

57 Claims, 31 Drawing Sheets

U.S. PATENT DOCUMENTS

| | | |
|---|---|---|
| 5,616,868 A | 4/1997 | Hagenmeyer et al. |
| 5,627,326 A | 5/1997 | Alesz et al. |
| 5,687,100 A | 11/1997 | Buttler et al. |
| 5,691,485 A | 11/1997 | Endo et al. |
| 5,700,957 A | 12/1997 | Alesz et al. |
| 5,728,952 A | 3/1998 | Yao et al. |
| 5,736,653 A | 4/1998 | Drahm et al. |
| 5,741,980 A | 4/1998 | Hill et al. |
| 5,753,827 A | 5/1998 | Cage |
| 5,767,665 A | 6/1998 | Morita et al. |
| 5,773,727 A | 6/1998 | Kishiro et al. |
| 5,796,010 A | 8/1998 | Kishiro et al. |
| 5,796,011 A | 8/1998 | Keita et al. |
| 5,796,012 A | 8/1998 | Gomi et al. |
| 5,814,739 A | 9/1998 | Van Cleve |
| 5,827,979 A | 10/1998 | Schott et al. |
| 5,831,178 A | 11/1998 | Yoshimura et al. |
| 5,850,039 A | 12/1998 | Van Cleve et al. |
| 5,854,430 A | 12/1998 | Drahm et al. |
| 5,892,159 A | 4/1999 | Smith |
| 5,907,104 A | 5/1999 | Cage et al. |
| 5,918,285 A | 6/1999 | Van der Pol |
| 5,945,609 A | 8/1999 | Kashimura et al. |
| 5,965,824 A | 10/1999 | Kishiro et al. |
| 5,969,265 A | 10/1999 | VanCleve et al. |
| 5,979,246 A | 11/1999 | Van Cleve et al. |
| 5,987,999 A | 11/1999 | VanCleve et al. |
| 6,006,609 A | 12/1999 | Drahm et al. |
| 6,041,665 A | 3/2000 | Hussain |
| 6,070,474 A | 6/2000 | Van der Pol et al. |
| 6,073,495 A | 6/2000 | Stadler |
| 6,082,202 A | 7/2000 | Hussain |
| 6,092,429 A | 7/2000 | Cunningham et al. |
| 6,170,339 B1 | 1/2001 | Van der Pol et al. |
| 6,199,022 B1 | 3/2001 | Cunningham |
| 6,233,526 B1 * | 5/2001 | Cunningham ................ 702/45 |
| 6,249,752 B1 | 6/2001 | Cunningham et al. |
| 6,347,293 B1 * | 2/2002 | Cunningham et al. ...... 702/189 |

OTHER PUBLICATIONS

Wolfgang Drahm, Munchen, und Christian Matt, Reinach/CH, "Coriolis–MassedurchfluBmessung–Gerades Einrohrsystem mit neuer Schwingungskompensation", Mengenmesstechnik, Sep. 1998, pp. 24–29, Automatisierungstechnische Praxis 40.

"New Mass Flowmeters Offer Higher Accuracy", New Products & Services, Chemical Engineering, Jan. 18, 1988, pp. 38–39.

U.S. patent application Ser. No. 09/344,840, filed Jun. 28, 1999.

* cited by examiner

MASS FLOW MEASUREMENT METHODS, APPARATUS, AND COMPUTER PROGRAM PRODUCTS USING MODE SELECTIVE FILTERING

FIELD OF THE INVENTION

The present invention relates to sensors and related methods and computer program products, and more particularly, to mass flow measurement methods, apparatus, computer program products.

BACKGROUND OF THE INVENTION

Many sensor applications involve the detection of mechanical vibration or other motion. Examples of sensors that utilize such motion detection include Coriolis mass flowmeters and vibrating tube densitometers. These devices typically include a conduit or other vessel that is periodically driven, i.e., vibrated. Properties such as mass flow, density and the like associated with a material contained in the conduit or vessel may be determined by processing signals from motion transducers positioned on the containment structure, as the vibrational modes of the vibrating material-filled system generally are affected by the combined mass, stiffness and damping characteristics of the containing conduit or vessel structure and the material contained therein.

A typical Coriolis mass flowmeter includes one or more conduits that are connected inline in a pipeline or other transport system and convey material, e.g., fluids, slurries and the like, in the system. Each conduit may be viewed as having a set of natural vibrational modes including, for example, simple bending, torsional, radial and coupled modes. In a typical Coriolis mass flow measurement application, a conduit is excited at resonance in one of its natural vibrational modes as a material flows through the conduit, and motion of the conduit is measured at points along the conduit. Excitation is typically provided by an actuator, e.g., an electromechanical device, such as a voice coil-type driver, that perturbs the conduit in a periodic fashion. Exemplary Coriolis mass flowmeters are described in U.S. Pat. Nos. 4,109,524 to Smith, 4,491,025 to Smith et al., and Re. 31,450 to Smith.

Unfortunately, the accuracy of conventional Coriolis mass flowmeters may be compromised by nonlinearities and asymmetries in the conduit structure, motion arising from extraneous forces, such as forces generated by pumps and compressors that are attached to the flowmeter, and motion arising from pressure forces exerted by the material flowing through the flowmeter conduit. The effects of these forces are commonly reduced for by using flowmeter designs that are balanced to reduce effects attributable to external vibration, and by using frequency domain filters, e.g., bandpass filters designed to filter out components of the motion signals away from the excitation frequency. However, mechanical filtering approaches are often limited by mechanical considerations, e.g., material limitations, mounting constraints, weight limitations, size limitations and the like, and frequency domain filtering may be ineffective at removing unwanted vibrational contributions near the excitation frequency.

SUMMARY OF THE INVENTION

According to embodiments of the invention, mass flow of a material in a conduit is estimated by mode selective filtering a plurality of motion signals representing motion of the conduit to generate a plurality of mode selective filtered motion signals such that the mode selective filtered motion signals preferentially represent motion associated with a vibrational mode of the conduit. A plurality of phase estimates is generated from the plurality of mode selective filtered motion signals. A mass flow estimate is generated from the plurality of phase estimates. The plurality of phase estimates may be estimated using a phase reference derived from one of the plurality of mode selective filtered motion signals.

In some embodiments of the invention, a modal transformation is applied to the plurality of motion signals to generate a plurality of modal response signals in a modal coordinate domain. A mode selective transformation is applied to the plurality of modal response signals to generate the plurality of mode selective filtered motion signals. In other embodiments of the invention, a frequency of a mode selective filtered motion signal of the plurality of mode selective filtered motion signals is estimated. Quadrature first and second reference signals are generated based on the estimated frequency. The plurality of phase estimates is generated from the plurality of mode selective filtered motion signals and the first and second reference signals.

In still other embodiments of the invention, a plurality of time difference estimates is generated from the plurality of phase estimates, and the mass flow estimate is generated from the plurality of time difference estimates. The plurality of time difference estimates may be generated from the plurality of phase estimates by dividing the plurality of phase estimates by a mode frequency to generate a plurality of time difference values. A plurality of zero-flow reference time differences may be applied to the plurality of time difference values to generate the plurality of time difference estimates. The mode frequency may be estimated from a modal motion signal generated from the plurality of motion signals. Density of material in the conduit may also be estimated from the estimated mode frequency.

According to other aspects of the invention, mass flow of a material in a conduit may be determined by processing a plurality of motion signals representing motion of the conduit using one of the plurality of motion signals as a timing reference to generate a like plurality of difference estimates, and estimating a slope parameter of a scaling function that relates the plurality of difference estimates to a like plurality of reference differences representing motion of the conduit at a known mass flow. A mass flow estimate may be estimated from the estimated slope parameter and the known mass flow.

In some embodiments of the invention, an augmented matrix including the plurality of reference differences is generated. The plurality of difference estimates is multiplied by a pseudoinverse of the augmented matrix to determine the slope parameter. In other embodiments, the plurality of difference estimates is multiplied by a pseudoinverse of the reference time differences to determine the slope parameter. The scaling parameter can also be iteratively estimated to determine the slope parameter, using, for example, a Least Mean Square (LMS) estimation procedure.

According to other aspects of the invention, an apparatus includes a conduit configured to contain a material. A plurality of motion transducers is operatively associated with the conduit and operative to produce a plurality of motion signals representing motion of the conduit. A signal processing circuit receives the plurality of motion signals and mode selective filters the plurality of motion signals to generate a plurality of mode selective filtered motion signals such that the mode selective filtered motion signals preferentially represent motion associated with a vibrational mode of the conduit. The signal processing circuit generates a plurality of phase estimates from the plurality of mode selective filtered motion signals, and generates a mass flow estimate from the plurality of phase estimates. The signal processing circuit may generate the plurality of phase estimates using a phase reference derived from one of the plurality of mode selective filtered motion signals.

According to still other embodiments of the invention, an apparatus includes a conduit and a plurality of motion transducers, operatively associated with the conduit, that generate a plurality of motion signals representing motion of the conduit. A signal processing circuit receives the plurality of motion signals and processes the plurality of motion signals using one of the plurality of motion signals as a timing reference to generate a like plurality of difference estimates. The signal processing circuit estimates a slope parameter of a scaling function that relates the plurality of difference estimates to a like plurality of reference differences representing motion of the conduit at a known mass flow, and generates a mass flow estimate from the estimated slope parameter and the known mass flow. The signal processing circuit may generate an augmented matrix including the plurality of reference differences, and may multiply the plurality of difference estimates by a pseudo-inverse of the augmented matrix to determine the slope parameter. Alternatively, the signal processing circuit may multiply the plurality of difference estimates by a pseudo-inverse of the reference time differences to determine the slope parameter. The signal processing may also iteratively estimate the scaling function.

According to other aspects of the invention, a computer program product for estimating mass flow of a material in a conduit includes a computer-readable storage medium having computer-readable program code embodied in the computer-readable storage medium. The computer-readable program code includes mass flow estimating computer-readable program code that mode selective filters a plurality of motion signals representing motion of the conduit to generate a plurality of mode selective filtered motion signals such that the mode selective filtered motion signals preferentially represent motion associated with a vibrational mode of the conduit, that generates a plurality of phase estimates from the plurality of mode selective filtered motion signals, and that generates a mass flow estimate from the plurality of phase estimates. The mass-flow estimating computer-readable program code may generate the plurality of phase estimates using a phase reference derived from one of the plurality of mode selective filtered motion signals. For example, the mass flow estimating computer-readable program code may estimate a frequency of a mode selective filtered motion signal of the plurality of mode selective filtered motion signals, generate quadrature first and second reference signals based on the estimated frequency, and generate the plurality of phase estimates from the plurality of mode selective filtered motion signals and the first and second reference signals.

According to other embodiments, the mass flow estimating computer-readable program code generates a plurality of time difference estimates from the plurality of phase estimates and generates the mass flow estimate from the plurality of time difference estimates. The mass flow estimating computer-readable program code may apply a modal transformation to the plurality of motion signals to generate a modal motion signal in a modal coordinate domain, estimate a mode frequency from the modal motion signal, and generate the plurality of time difference estimates from the plurality of phase estimates using the estimated mode frequency. The computer-readable program code may further include density estimating computer program code that estimates density of material in the conduit from the estimated mode frequency.

According to yet other aspects of the invention, computer-readable program code embodied in a computer-readable storage medium includes mass flow estimating computer-readable program code that processes a plurality of motion signals representing motion of the conduit using one of the plurality of motion signals as a timing reference to generate a like plurality of difference estimates, that estimates a slope parameter of a scaling function that relates the plurality of difference estimates to a like plurality of reference differences representing motion of the conduit at a known mass flow, and that generates a mass flow estimate from the estimated slope parameter and the known mass flow. The mass flow estimating computer-readable program code may generate an augmented matrix including the plurality of reference differences and multiply the plurality of difference estimates by a pseudoinverse of the augmented matrix to determine the slope parameter. Alternatively, the mass flow estimating computer-readable program code may multiply the plurality of difference estimates by a pseudoinverse of the reference time differences to determine the slope parameter. The mass flow estimating computer-readable program code may also iteratively estimate the scaling function.

DETAILED DESCRIPTION OF EMBODIMENTS

Figure 1:
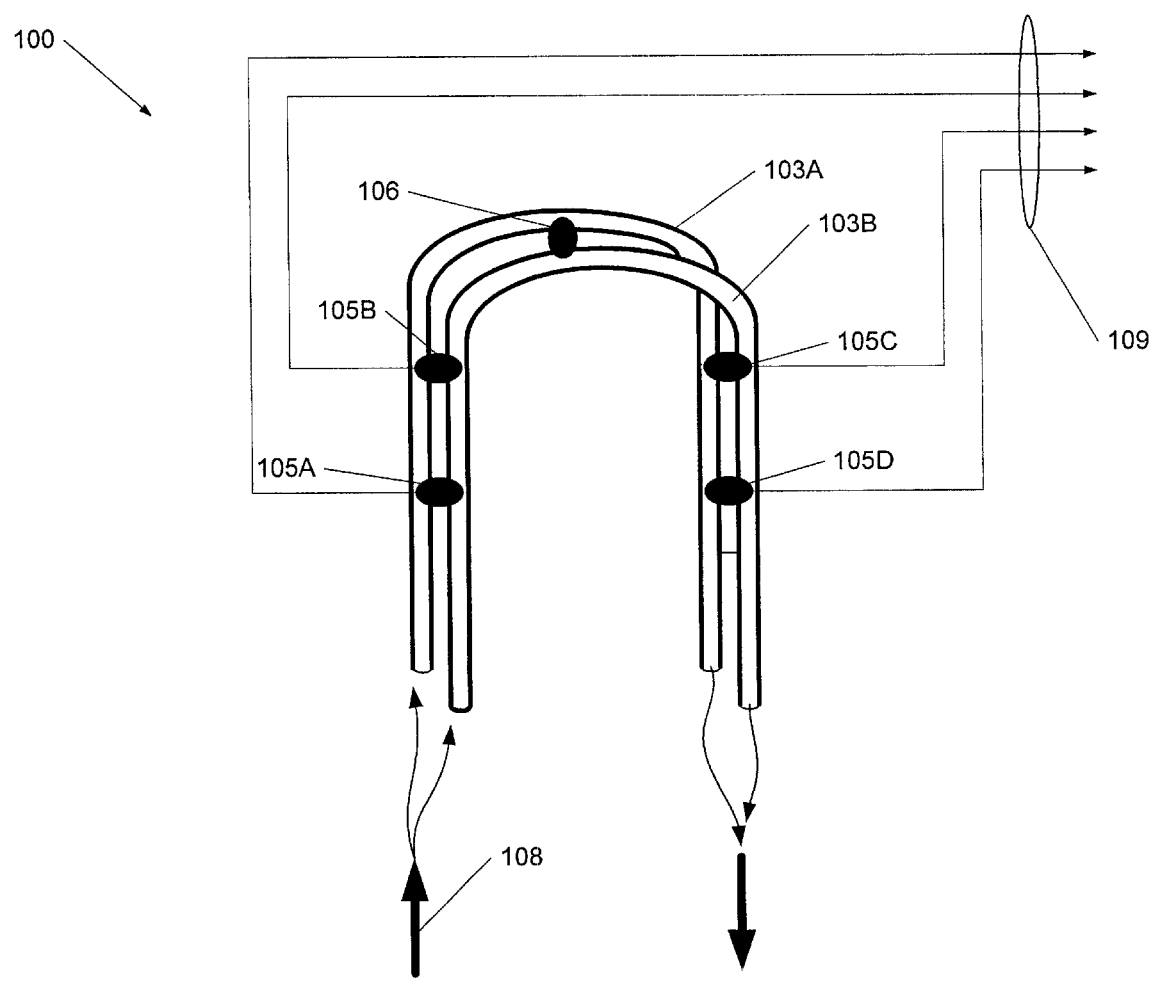
FIG. 1 is a schematic diagram conceptually illustrating a curved-tube flow sensor structure.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as systems (apparatus), methods, or computer program products.

The embodiments of the present invention described herein relate to Coriolis mass flowmeters. Those skilled in the art will appreciate, however, that the invention described herein is generally applicable to determination of motion in a wide variety of mechanical structures, and thus the apparatus and methods of the present invention are not limited to Coriolis mass flowmetering.

As will be appreciated by one of skill in the art, the present invention may be embodied as apparatus and/or method and/or computer program product. Accordingly, the present invention may be implemented in hardware or in a combination of hardware and software aspects. Furthermore, the present invention may also take the form of a computer program product including a computer-usable storage medium having computer-usable program code embodied in the medium. Any suitable computer readable medium may be utilized, including semiconductor memory devices (e.g., RAMs, ROMs, EEPROMs, and the like), hard disks, CD-ROMs, optical storage devices, and magnetic storage devices.

Computer program code for carrying out operations of the present invention may be written in an object oriented programming language, such as Java® or C++, and/or in a procedural programming languages, such as "C." The program code may execute one a single computer or data processing device, such as a microcontroller, microprocessor, or digital signal processor (DSP), or may be executed on multiple devices, for example, on multiple data processing devices that communicate via serial or parallel data busses within an electronic circuit board, chassis or assembly, or which form part of a data communications network such as a local area network (LAN), wide area network (WAN), or internet.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program code (instructions). These computer program code may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program products also may be embodied in a computer-readable storage medium (e.g., magnetic disk or semiconductor memory, code magnetic memory or the like) that can direct a computer or other programmable data processing apparatus to function in a particular manner, such that the computer program stored in the computer-readable memory produce an article of manufacture including instruction means which implement the function specified in the flowchart and/or block diagram block or blocks.

The computer program code may also be loaded onto a computer or other programmable data processing apparatus to cause a series of operational steps to be performed on the computer or other programmable apparatus to produce a computer implemented process such that the code that executes on the computer or other programmable apparatus provides steps for implementing the functions specified in the flowchart and/or block diagram block or blocks.

Modal Behavior of a Vibrating Conduit

Behavior of a vibrating structure such as a Coriolis mass flowmeter conduit may be described in terms of one or more natural modes having associated natural frequencies of vibration. The modes and the associated natural frequencies may be mathematically described by eigenvectors and associated eigenvalues, the eigenvectors being unique in relative magnitude but not absolute magnitude and orthogonal with respect to the mass and stiffness of the structure. The linearly independent set of vectors may be used as a transformation to uncouple equations that describe the structure's motion. In particular, the response of the structure to an excitation can be represented as a superposition of scaled modes, the scaling representing the contribution of each mode to the motion of the structure. Depending on the excitation, some modes may contribute more than others. Some modes may be undesirable because they may contribute energy at the resonant frequency of desired modes and, therefore, may corrupt measurements taken at the resonant frequency of a desired mode, such as phase difference measurements taken at the drive frequency.

Conventional Coriolis mass flowmeters typically use structural and temporal filtering to reduce the effects of undesirable modes. Conventional structural filtering techniques include using mechanical features such as brace bars designed to decouple in phase and out of phase bending modes, actuators positioned such that they are less likely to excite undesirable modes, and transducers positioned such that they are less sensitive to undesirable modes. Structural filtering techniques can be very effective in reducing energy of undesired modes, but may be limited by geometric and fabrication constraints.

Temporal filtering techniques typically modify transducer signals based on time domain or frequency domain parameters. For example, a typical Coriolis mass flowmeter may include frequency domain filters designed to remove frequency components that are significantly correlated with undesired modes. However, off-resonance energy from undesired modes may contribute considerably to energy at the resonant frequency of a desired mode. Because frequency-domain filters generally are ineffective at distinguishing the contribution of multiple modes at a given frequency, the contribution of undesired modes at a measurement frequency may be a significant source of error in process parameter measurements.

A sensor conduit structure with negligible damping and zero flow may be assumed to have purely real natural or normal modes of vibration, i.e., in each mode, each point of the structure reaches maximum difference simultaneously. However, a real conduit having non-negligible damping and a material flowing therethrough has a generally complex response to excitation, i.e., points of the structure generally do not simultaneously reach maximum amplitude. The motion of the conduit structure may be described as a complex mode having real and imaginary components or, alternatively, magnitude and phase components. Coriolis forces imparted by the flowing material render motion of the sensor conduit mathematically complex.

Even if complex, motion of a conduit structure can be described as a superposition of scaled natural ("normal" or "single degree of freedom" (SDOF)) modes, as the real and imaginary parts of a complex mode are linearly independent by definition. To represent complex motion, complex scaling coefficients may be used in combining the constituent real normal modes. Particular real normal modes may be closely correlated with the imaginary component of the complex mode while being significantly less correlated with the real component of the complex mode. Accordingly, these particular real normal modes may be more closely correlated with the Coriolis forces associated with the material in the sensor conduit, and thus can provide information for generating an accurate estimate of a parameter associated with the material.

A conceptual model of one type of Coriolis mass flowmeter sensor 100 is provided in FIG. 1. Motion transducers 105A, 105B, 105C, 105D (e.g., velocity transducers) are positioned to detect relative motion of first and second curved conduits 103A, 103B of the sensor 100 that are vibrated by a an actuator 106 as a material 108 flows through the conduits 103A, 103B, the motion transducers 105A, 105B, 105C, 105D producing motion signals 109. A "straight tube" Coriolis flowmeter sensor 200 illustrated in FIG. 2 includes a conduit 203 configured to contain a material 208 from a pipeline 207 connected to the sensor 200 at flanges 202. Within a housing 204 surrounding the conduit 203, an actuator 206 is operative to excite the conduit 203. Motion transducers 205A, 205B, 205C, 205D (e.g., velocity transducers, accelerometers or other motion-sensing devices) are positioned along the conduit 203. The motion transducers 205A, 205B, 205C, 205D produce motion signals 209 representing motion of the conduit 203 in response to a plurality of forces F that may include, for example, a drive force imparted by the actuator 206, Coriolis forces arising from the flowing material 208, pressure forces exerted by the material 208, and other extraneous forces such as forces imparted by the pipeline 207 and forces generated by pumps, compressors and other equipment (not shown) connected to the pipeline 207 and conveyed to the conduit 203 via the flanges 202.

Figure 2:
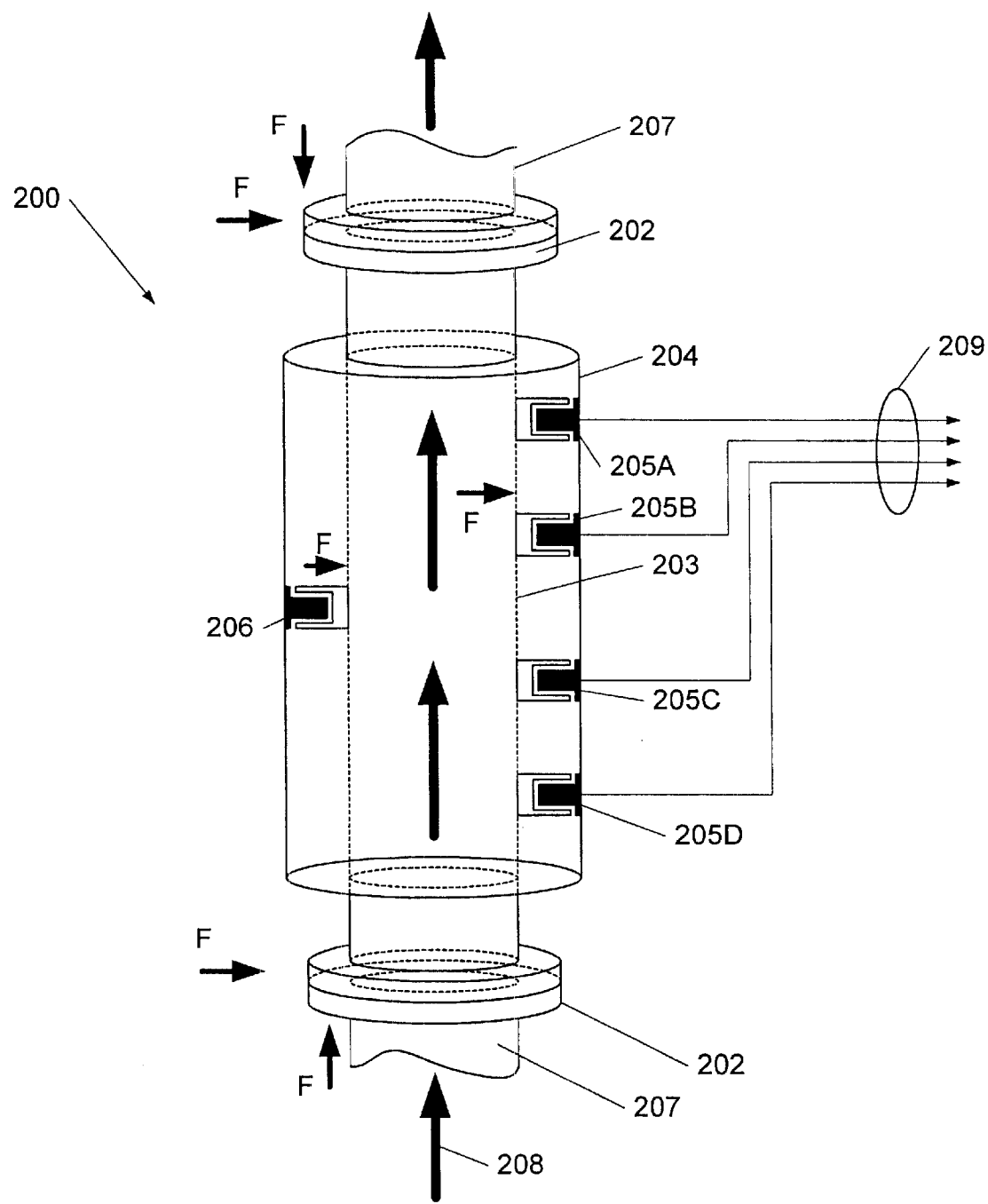
FIG. 2 is a schematic diagram conceptually illustrating a straight-tube flow sensor structure.

For a flowmeter structure such as those illustrated in FIGS. 1 and 2, a response vector x can be constructed from the signals produced by motion transducers that are operatively associated with the structure, such as the motion signals 109, 209 produced by motion transducers 105A, 105B, 105C, 105D, 205A, 205B, 205C, 205D of FIGS. 1 and 2. For example, the motion signals may be sampled to generate motion signal values $x_1, x_2, \ldots, x_n$ of a response vector x. A real normal modal matrix $\Phi$, that is, an eigenvector matrix relating the physical motion vector to a modal motion vector $\eta$ representing motion in a plurality of natural (SDOF) modes, may then be identified such that:

$$x = \Phi \varsigma. \tag{1}$$

The modal matrix $\Phi$ can be identified using a number of techniques. For example, trial and error or inverse techniques may be used as described in U.S. Pat. Application Ser. No. 08/890,785, filed Jul. 11, 1997, assigned to the assignee of the present application and incorporated by reference herein in its entirety.

Exemplary Mass Flowmeters

According to embodiments of the present invention, selective modal filtering techniques are used to produce mode selective filtered motion signals that are then used to generate phase estimates, which are in turn used to generate a mass flow estimate. Exemplary embodiments according to this aspect of the present invention will now be described, in particular, embodiments using "straight tube" sensors such as the sensor 200 of FIG. 2. Those skilled in the art will appreciate, however, that the present invention is also applicable to curved-conduit structures, such as that used in the sensor 100 illustrated in FIG. 1, as well as to other material-containing structures used in mass flowmeters, densitometers and the like. Those skilled in the art will further appreciate that the present invention is also applicable to the characterization of motion in a variety of other structures.

Figure 3:
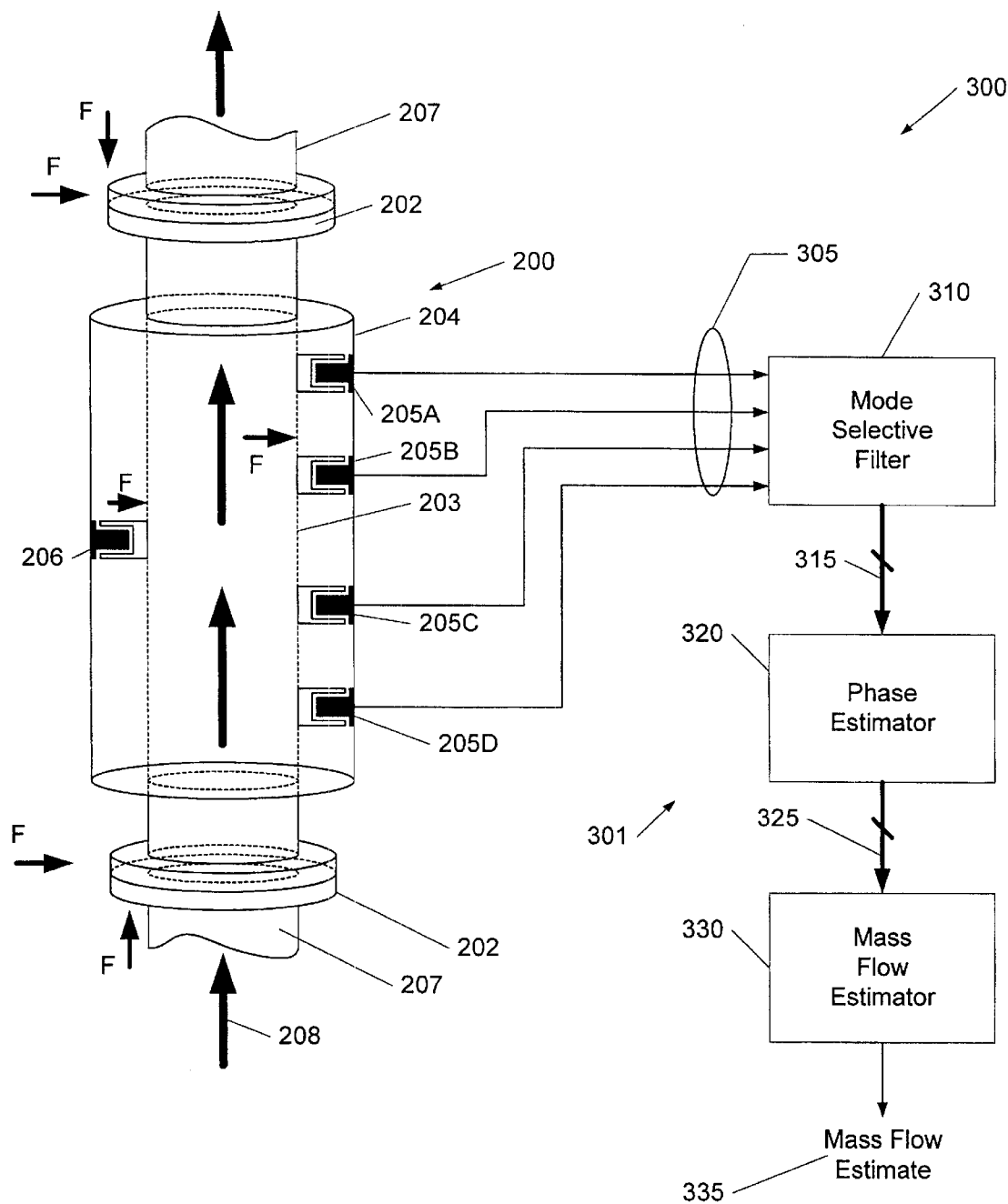
FIG. 3 is a schematic diagram illustrating a mass flow estimating apparatus according to embodiments of the invention.

FIG. 3 illustrates a mass flow estimating apparatus 300 according to embodiments of the present invention. The apparatus 300 includes a material-containing conduit 203 and operatively associated motion transducers 205A, 205B, 205C, 205D of a flowmeter sensor 200, along with a signal processing circuit 301 that is operative to generate a mass flow estimate from motion signals 305 produced by the motion transducers 205A, 205B, 205C, 205D. Like numbers are used in FIGS. 2 and 3 to denote like components of the sensor 200, detailed description of which will not be repeated here in light of the description of FIG. 2.

The signal processing circuit 301 includes a mode selective filter 310 that is configured to receive the motion signals 305 and operative to selectively pass one or more components of the motion signals 305 to produce a plurality of mode selective filtered motion signals 315. The mode selective filter 310 is preferably derived from a modal characterization of the sensor 200 as described in U.S. patent application Ser. No. 09/116,410, filed Jul. 16, 1998 the disclosure of which is incorporated by reference herein in its entirety. The signal processing circuit 301 also includes a phase estimator 320 that is responsive to the mode selective filtered motion signals 315 and operative to generate a plurality of phase estimates 325 therefrom. The signal processing circuit 301 further includes a mass flow estimator 330 that is responsive to the phase estimator 320 and produces a mass flow estimate 335 from the plurality of phase estimates 325.

Figure 4:
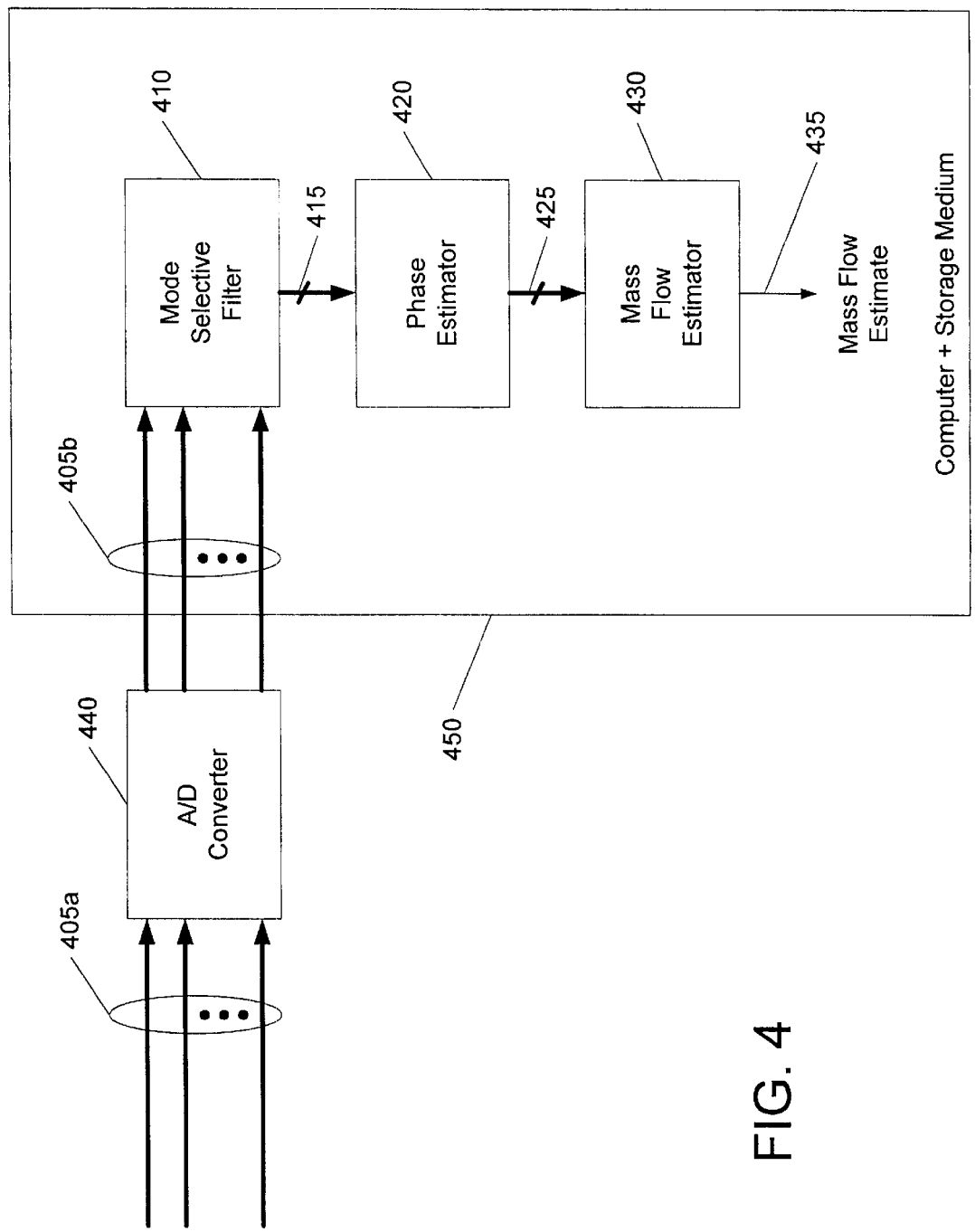
FIG. 4 is a schematic diagram illustrating a signal processing circuit according to other embodiments of the invention.

FIG. 4 illustrates an exemplary implementation of a mode selective filter 410, phase estimator 420 and mass flow estimator 430 according to embodiments of the present invention. A plurality of motion signals 405a, e.g., analog outputs from velocity or other motion transducers operatively associated with a conduit or other material-containing vessel, is sampled and digitized by an A/D converter 440, producing a plurality of digital motion signals 405b. The digital motion signals 405b are processed by a digital mode selective filter 410 to produce a plurality of mode selective filtered digital motion signals 415. A digital phase estimator 420 generates a plurality of digital phase estimates 425 from the plurality of mode selective filtered digital motion signals 415. A digital mass flow estimator 430 produces a digital mass flow estimate 435 from the plurality of digital phase estimates 425. As shown, the mode selective filter 410, the phase estimator 420 and the mass flow estimator 430 may be implemented as computer readable program code executed by a data processor 450, for example, a combination of a computer (e.g., a microcontroller, microprocessor, digital signal processor (DSP), or other computing device) and an associated storage medium (e.g., semiconductor memory magnetic storage and/or optical storage).

Figure 5:
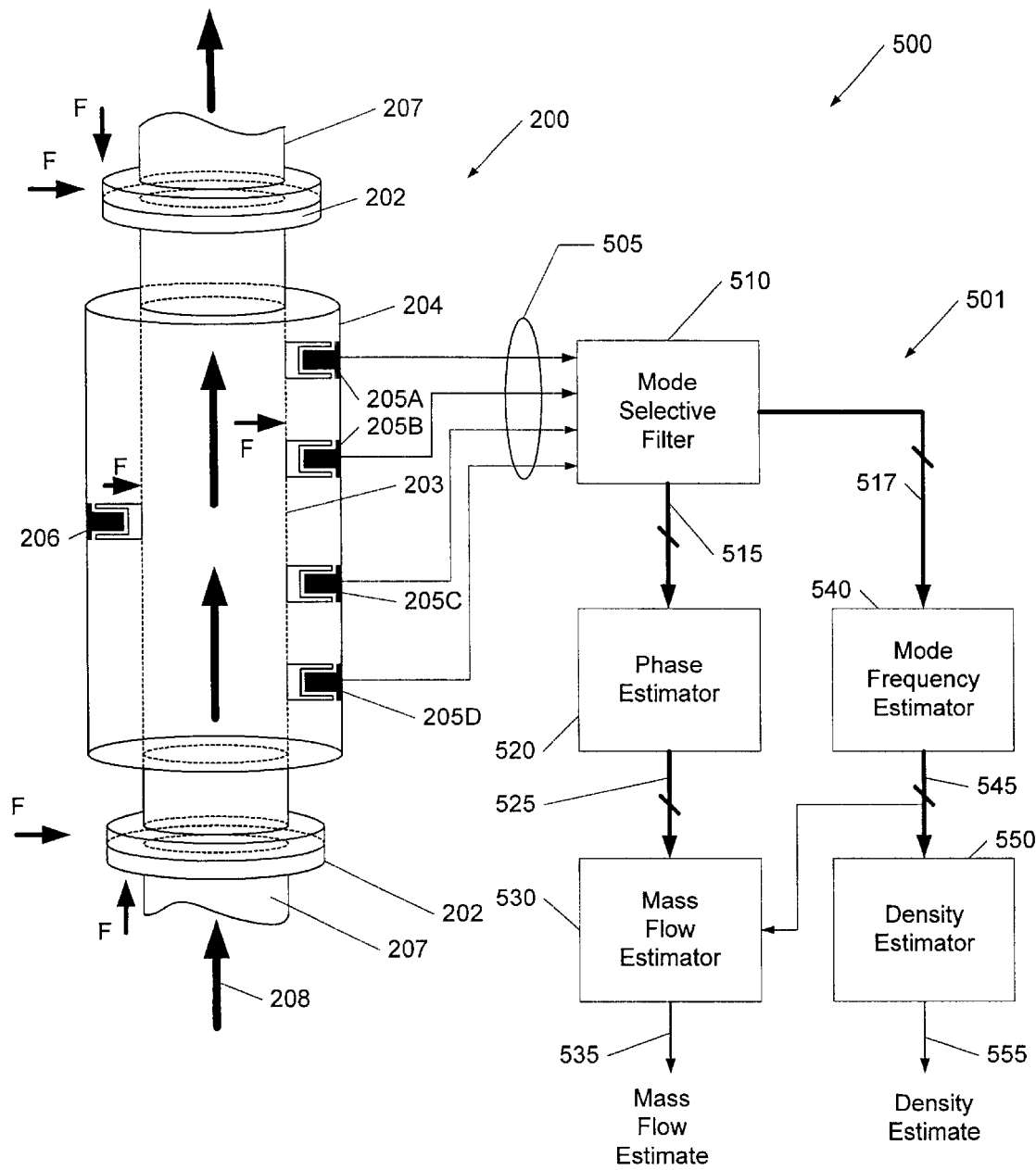
FIG. 5 is a schematic diagram illustrating a mass flow estimating apparatus according to other embodiments of the invention.

FIG. 5 illustrates an exemplary mass flow estimating apparatus 500 according to other embodiments of the present invention. The apparatus 500 includes a material-containing conduit 203 and operatively associated motion transducers 205A, 205B, 205C, 205D of a straight-tube sensor 200 such as that described with reference to FIG. 2, further detailed description of which will not be repeated in light of the description of FIG. 2. A signal processing circuit 501 includes a mode selective filter 510 that is configured to receive the motion signals 505 produced by the sensor 200 and operative to selectively pass one or more components of the motion signals 505 to produce a plurality of mode selective filtered motion signals 515. The mode selective filter 510 is further operative to produce at least one modal motion signal 517, i.e., at least one signal that represents motion of the conduit 203 in a modal domain defined by at least one natural (SDOF) mode of the conduit 203. The mode selective filter 510 is preferably derived from a modal characterization of the sensor 200 as described in the aforementioned U.S. patent application Ser. No. 09/116,410, filed Jul. 16, 1998.

The signal processing circuit 501 further includes a phase estimator 520 that is responsive to the mode selective filter 510 and operative to generate a plurality of phase estimates 525 from the plurality of mode selective filtered motion signals 515. The signal processing circuit 501 also includes a mass flow estimator 530 that is responsive to the phase estimator 520 and produces a mass flow estimate 535 from the plurality of phase estimates 525 using at least one mode frequency estimate 545 generated by a mode frequency estimator 540. The mode frequency estimator 540 produces the at least one mode frequency estimate 545 responsive to the at least one modal motion signal 517. The signal processing circuit 501 further includes a density estimator 550 that is responsive to the at least one mode frequency estimate 545 to generate a density estimate 555.

Figure 6:
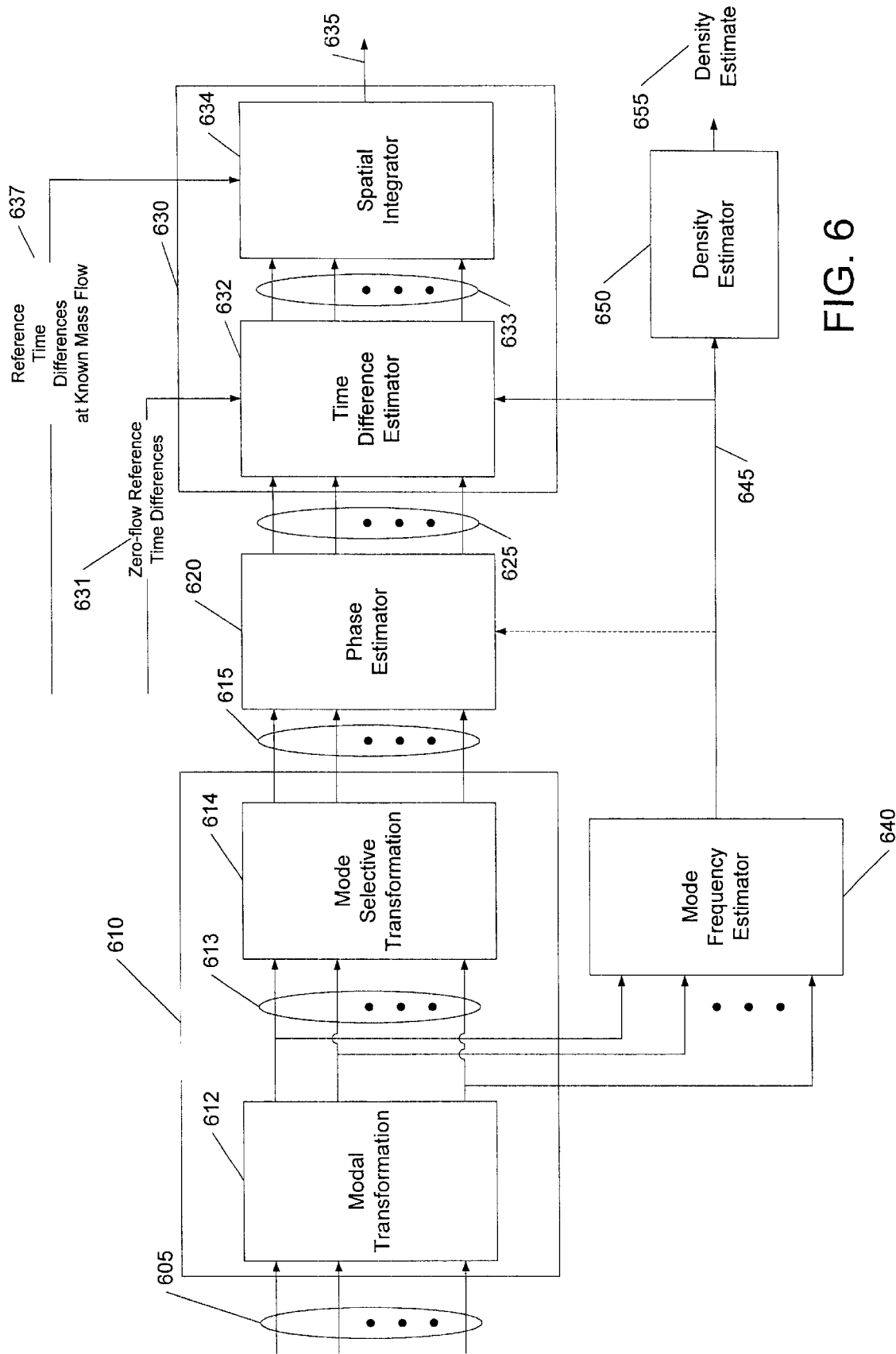
FIG. 6 is a schematic diagram illustrating an apparatus for estimating mass flow and density according to embodiments of the invention.

FIG. 6 illustrates an apparatus 600 operative to estimate mass flow and density from a plurality of motion signals 605, according to embodiments of the invention. The apparatus 600 includes a mode selective filter 610, a phase estimator 620, a mass flow estimator 630, a mode frequency estimator 640 and a density estimator 650. The mode selective (or "mode pass") filter 610 includes a modal transformation 612 that transforms a plurality of motion signals 605 into a plurality of modal motion signals 613 that represent motion in a plurality of natural modes, as described above with reference to equation (1) and in the aforementioned U.S. patent application Ser. No. 09/116,410, filed Jul. 16, 1998. The mode selective filter 610 also includes a mode selective transformation 614 that selectively transforms the plurality of modal motion signals 613 back out of the modal domain, producing mode selective filtered motion signals 615 that are filtered such that components of the original motion signals 615 that are associated with one or more desired modes are preferentially passed in relation to components associated with other, undesired natural modes. Such a mode selective transformation is also described in U.S. patent application Ser. No. 09/116,410, filed Jul. 16, 1998. The modal motion signals 613 are passed on to the mode frequency estimator 640, which generates one or more mode frequency estimates 645.

The mode selective filtered motion signals 615 are passed on to the phase estimator 620, which generates a plurality of phase estimates 625 therefrom using a phase reference that is derived from the plurality of motion signals 605. For example, as described in detail with reference to FIG. 7 below, the phase reference may be derived from one or more of the mode selective filtered motion signals 615. Alternatively, the phase reference may be derived from one or more mode frequency estimates 645 generated from one or more of the modal motion signals 613 by the mode frequency estimator 640.

The phase estimates 625 are passed onto the mass flow estimator 630 that includes a time difference estimator 632 and a spatial integrator 634. Using the one or more mode frequency estimates 645 generated by the mode frequency estimator 640, the time difference estimator 632 generates a plurality of time difference estimates 633 from the plurality of phase estimates 625. The time difference estimator 640 may also use zero-flow reference time differences 631, i.e., values representing time differences under a zero mass flow condition which may corrupt measurements at other mass flow rates, to generate time differences 633 that are corrected for such "zero offset." As described below, an estimate of a drive mode frequency may be generated by the mode frequency estimator 640, and phase estimates may be divided by this estimated drive mode frequency to yield uncorrected time difference estimates. The uncorrected time difference estimates may then be corrected using the zero-flow reference time differences 631 (e.g., by subtraction therefrom) to generate the time difference estimates 633.

The time difference estimates 633 generated by the time difference estimator 632 are provided to a spatial integrator 634. As described in detail below, the spatial integrator 634 may determine a slope parameter of a scaling vector function that relates the plurality of time difference estimates 633 to a plurality reference time differences 637 corresponding to a known mass flow. This slope parameter may then be used to generate a mass flow estimate 635 from the known mass flow.

As also shown in FIG. 6, the density estimator 650 may also use the mode frequency estimate 645 to generate an estimate of density of the material for which mass flow is being determined. The density estimator 650 may utilize techniques similar to those used to generate a density estimate 655 from a non-mode selective filtered transducer signal, such as those described in U.S. Pat. No. 5,687,100 to Buttler et al (issued Nov. 11, 1997) and U.S. Pat. No. 5,295,084 to Arunachalam et al. (issued Mar. 15, 1994), incorporated by reference herein in their entireties. For example, according to embodiments of the present invention, density estimates may be generated by using modal frequency estimates in place of the conventional frequency estimates utilized in the aforementioned patents.

Figure 7:
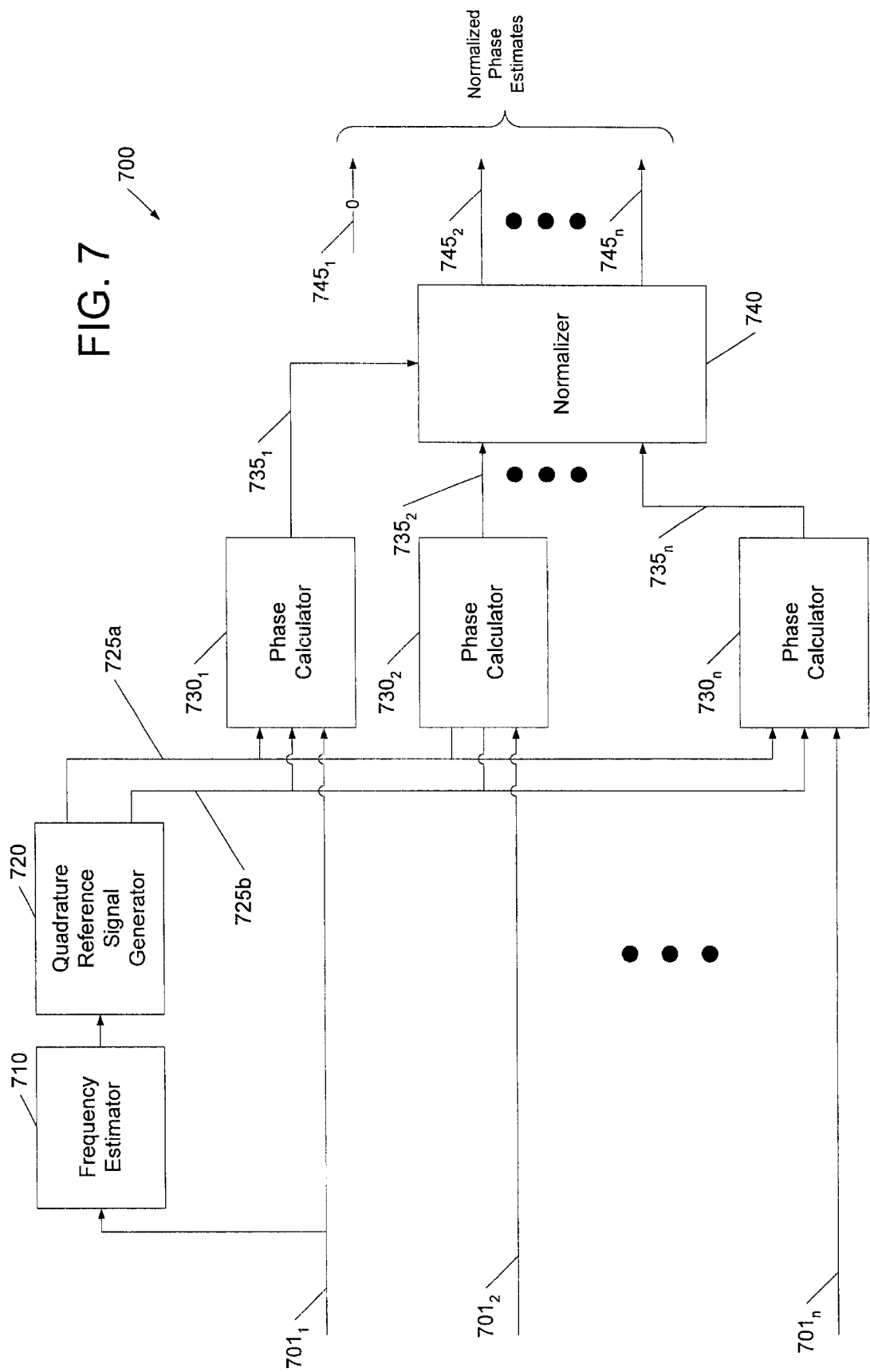
FIG. 7 is a schematic diagram illustrating an apparatus for generating phase estimates according to embodiments of the invention.
Figure 8:
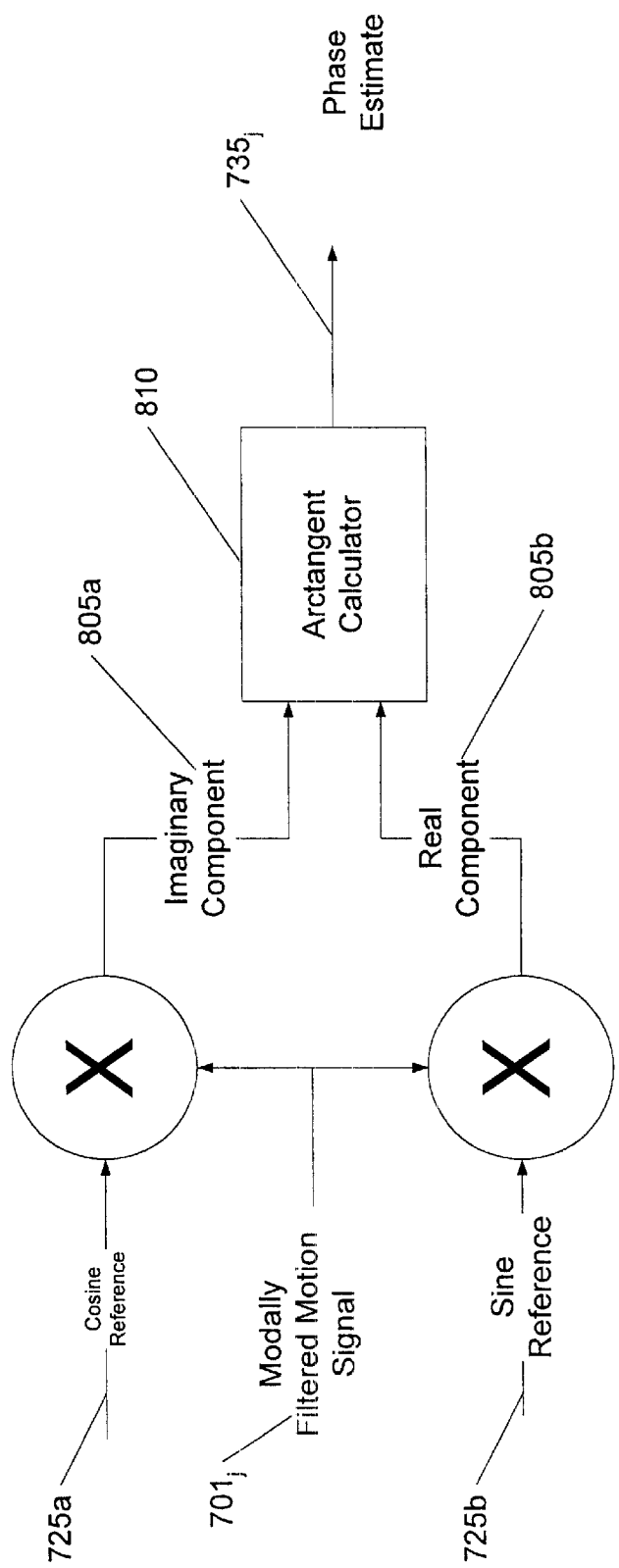
FIG. 8 is a schematic diagram illustrating an apparatus for generating phase estimates according to other embodiments of the invention.
Figure 9:
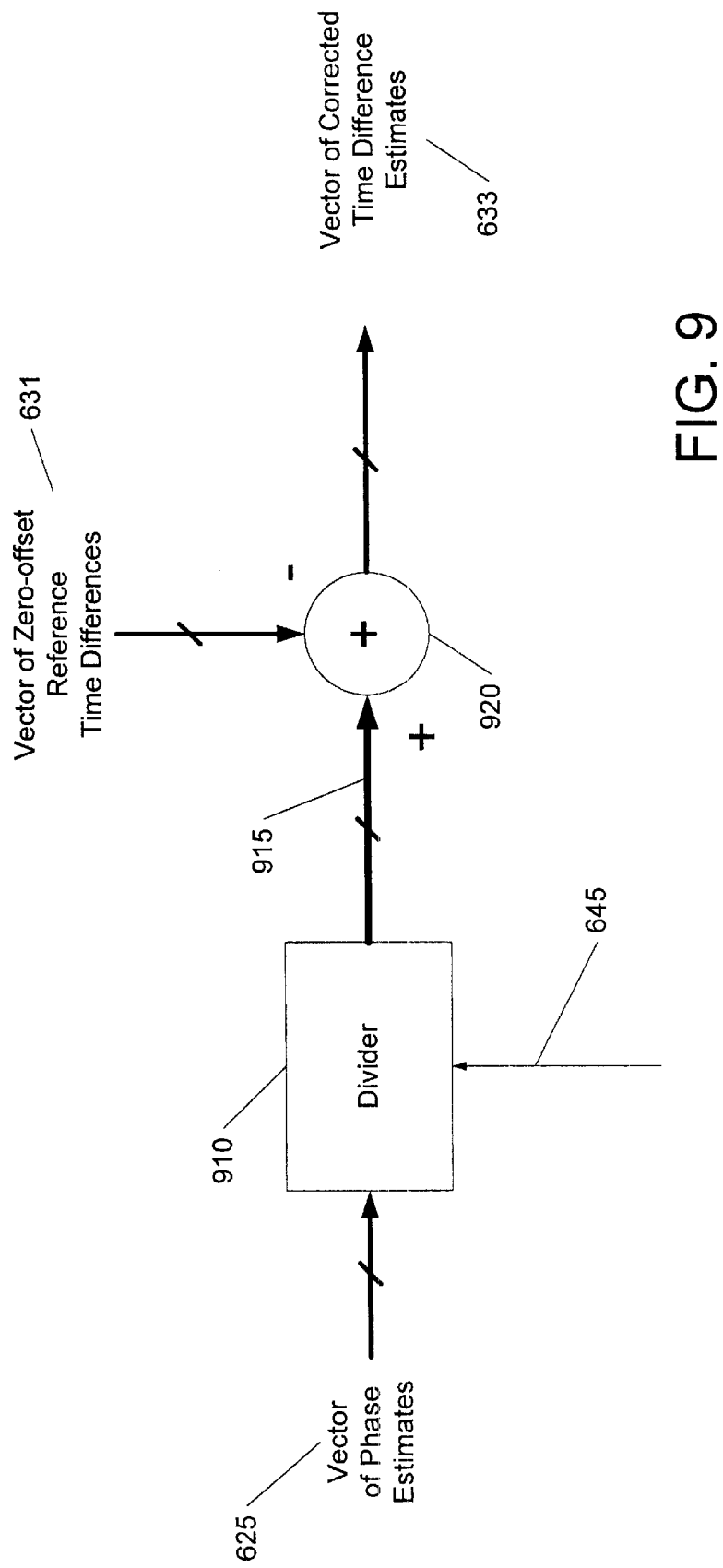
FIG. 9 is a schematic diagram illustrating an apparatus for generating time difference estimates according to embodiments of the invention.

FIGS. 7–9 illustrate exemplary structures for implementing various components of FIG. 6. It will be appreciated that the mode selective filter 610, phase estimator 620, mass flow estimator 630, the mode frequency estimator 640 of FIG. 6, as well as the structures of FIGS. 7–9, may be implemented in a digital domain, e.g., as executable modules, subroutines, objects and/or other types of software and/or firmware running on a microprocessor, microcontroller, DSP or other computing device. In such implementations, "signals," such as the modal motion signals 613, mode selective filtered motion signals 615 and phase estimates 633 may include vectors of digital signal values that are produced at calculation intervals and upon which computations are performed to implement the functions described. However, it will be appreciated that all or some of these signals may, in general, be digital or analog, and that the operations performed thereon may be performed by special-purpose digital hardware and/or analogous analog hardware.

FIG. 7 illustrates an example of a phase estimator 700 according to embodiments of the present invention. The phase estimator 700 includes a frequency estimator 710 that estimates a frequency of a mode selective filtered motion signal $701_1$ of a plurality of mode selective filtered motion signals $701_1, 701_2, \ldots 701_n$. The frequency estimator 710 produces a frequency estimate 715 which is applied to a quadrature reference signal generator 720 that generates first and second (e.g., sine and cosine) reference signals 725a, 725b that have the estimated frequency and that are in phase quadrature with respect to one another. The frequency estimator 710 may, for example, be a digitally-implemented adaptive notch filter that is operative to determine the frequency estimate 715, and the quadrature reference signal generator 720 may generate the quadrature reference signals 725a, 725b using a "twiddle" function, in a manner similar to that described in U.S. patent application Ser. No. 09/344,840 entitled *Multi-Rate Digital Signal Processor for Signals from Pick-Offs on a Vibrating Conduit*, filed Jun. 28, 1999, assigned to the assignee of the present invention, and incorporated herein by reference in its entirety. However, it will be appreciated that other techniques, including other digital and analog signal processing techniques for generating phase and quadrature reference signals, may be used to generate the frequency estimate 715 and/or the quadrature reference signals 725a, 725b. For example, rather than generating the frequency estimate 715 from a mode-selectively filtered signal as shown in FIG. 7, the frequency estimate may be a mode frequency estimate, such as one or more of the mode frequency estimates 645 produced by the mode frequency estimator 640 of FIG. 6.

The first and second phase reference signals 725a, 725b are applied to a plurality of phase calculators $730_1, 730_2, \ldots, 730_n$, respective ones of which generate respective phase estimates $735_1, 735_2, \ldots 735_n$ from respective ones of the mode selective filtered motion signals $701_1, 701_2, \ldots, 701_n$. Phase estimates $735_2, \ldots, 735_n$ are then normalized with respect to one of the phase estimates phase estimates $735_1$ by a normalizer 740 to produce a plurality of normalized phase estimates $745_1, 745_2, \ldots, 745_n$. The normalized phase estimates $745_1, 745_2, \ldots, 745_n$ may then be used to estimate mass flow, as described above with reference to FIG. 6.

Referring again to FIG. 6, the mode frequency estimator 640 may use frequency estimation techniques similar to those described above with reference to FIG. 7. For example, the frequency-determining adaptive notch filtering techniques described in the aforementioned U.S. patent application Ser. No. 09/344,840 entitled *Multi-Rate Digital Signal Processor for Signals from Pick-Offs on a Vibrating Conduit* may be used to generate at least one frequency estimate 645 for at least one of the modal motion signals 617.

Exemplary computing operations for demodulating a mode selective filtered motion signal 701j using the synthesized quadrature (e.g., sine and cosine) reference signals 725a, 725b are illustrated in FIG. 8. The mode selective filtered motion signal 701j is separately multiplied by each of the quadrature reference signals 725a, 725b, generating real and imaginary component signals 805b, 805a. An arctangent calculator 810 then computes an arctangent of the real and imaginary component signals 805b, 805a to generate a phase estimate 735j. Preferably, the real and imaginary component signals 805b, 805a are filtered before application to the arctangent calculator 810, such that non-DC components of the signals 805b, 805a are attenuated.

FIG. 9 illustrates an exemplary computing structure for generating corrected time difference estimates 633 according to embodiments of the present invention. A vector of phase estimates 625 (which may be normalized) is divided by an estimated mode frequency 645, preferably one or more frequencies associated with a drive mode. The resulting vector of time differences 915 is then corrected by subtracting a corresponding vector of zero-flow reference time differences 631, producing a vector of corrected time difference estimates 633. A similar correction could alternatively be achieved by subtracting a vector of phase values associated with zero flow from the phase estimates $735_1, 735_2, \ldots, 735_n$ described above.

Spatial Integration of Time Difference Estimates

According to other aspects of the present invention, time differences estimates, such as the corrected time difference estimates described above, may be processed using a "spatial integration" procedure to produce a mass flow estimate. According to various embodiments of the present invention described below, numerous techniques may be used to determine a slope parameter that relates time difference estimates associated with an unknown mass flow to reference time differences associated with a known mass flow, including closed-form pseudoinverse techniques and iterative techniques. This slope parameter may be used to generate an estimate of the unknown mass flow.

As described in the aforementioned U.S. patent application Ser. No. 09/116,410, filed Jul. 16, 1998, a vector $Y_e$ of time difference values at known mass flow $F_c$ may be identified, and an unknown mass flow can be described in terms of this reference time difference vector $Y_e$ by a scalar multiplication, that is, a vector of estimated time differences $X_e$ for an unknown mass flow can be scaled by a scale factor a (hereinafter referred to as a "slope parameter") to produce the reference time difference vector $Y_e$. In order to determine the unknown mass flow, the known mass flow $F_c$ is multiplied by the slope parameter a. The reference time difference vector $Y_e$ and the time difference estimate vector $X_e$ may be related as:

$$X_e = aY_e + b \begin{vmatrix} RU \\ SV \\ TW \end{vmatrix}. \tag{2}$$

Rearranging equation (2) gives:

$$X_e = \begin{bmatrix} Y_e & \vdots & 1 \\ & & 1 \end{bmatrix} \begin{Bmatrix} a \\ b \end{Bmatrix} = Zc, \qquad (3)$$

where the augmented matrix Z is formed by augmenting the reference time difference vector $Y_e$ with a column of ones. Equation (3) may be solved for the scaling vector c by premultiplying the time difference estimate vector $X_e$ by the pseudo inverse W of the augmented matrix Z:

$$c = Z^{-1} X_e = W X_e, \qquad (4)$$

where the matrix inverse operator ($^{-1}$) is used to denote a pseudo inverse. Solving for the vector c and then multiplying $F_c$ by the slope parameter a of the vector c can yield an estimate of mass flow.

Figure 10:
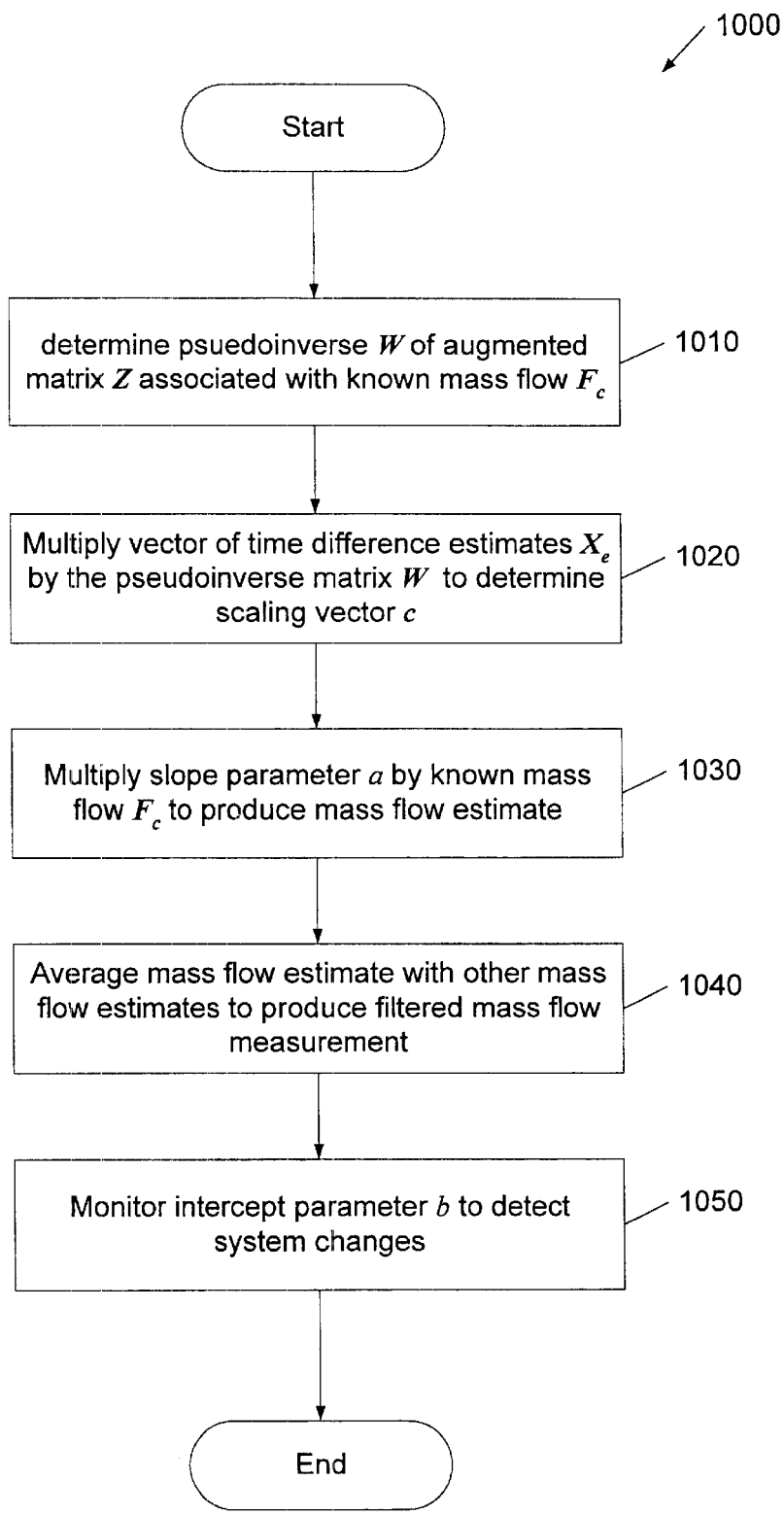
FIG. 10 is a flowchart illustrating operations for estimating mass flow according to embodiments of the invention.
Figure 11:
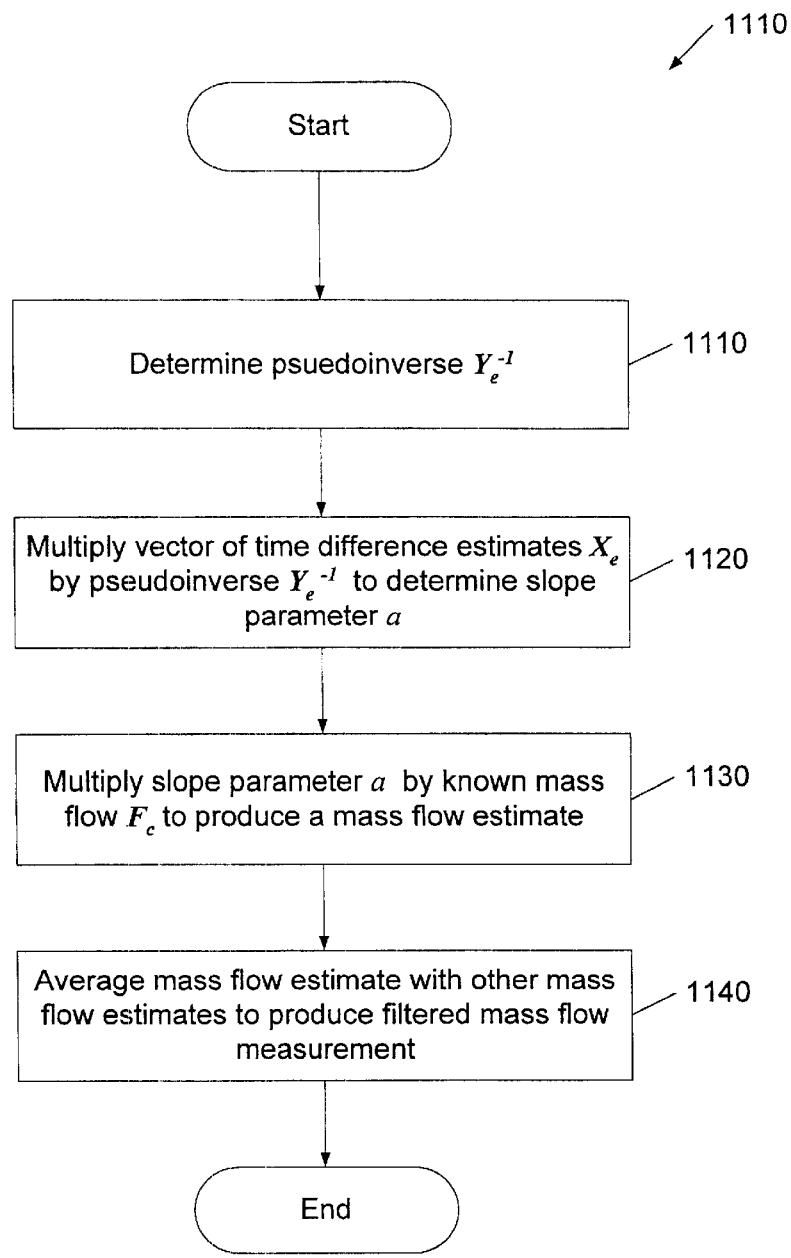
FIG. 11 is a flowchart illustrating operations for estimating mass flow according to other embodiments of the invention.

FIGS. 10 and 11 are flowchart illustrations of exemplary operations for generating a mass flow estimate from a plurality of time difference estimates according to various embodiments of the present invention. Those skilled in the art will understand that the operations of these flowchart illustrations may be can be implemented using computer instructions. These instructions may be executed on a computer or other data processing apparatus, such as the data processor 450 of FIG. 4, to create an apparatus (system) operative to perform the illustrated operations. The computer instructions may also be stored as computer readable program code on a computer readable medium, for example, an integrated circuit memory, a magnetic disk, a tape or the like, that can direct a computer or other data processing apparatus to perform the illustrated operations, thus providing means for performing the illustrated operations. The computer readable program code may also be executed on a computer or other data-processing apparatus to cause the apparatus to perform a computer-implemented process. Accordingly, FIGS. 10 and 11 support apparatus (systems), computer program products and methods for performing the operations illustrated therein.

FIG. 10 illustrates operations 1000 for generating a mass flow estimate from a vector $X_e$ of time difference estimates along the above-described lines according to embodiments of the present invention. A pseudoinverse W of an augmented matrix Z including a vector of reference time differences $Y_e$ associated with a known mass flow $F_c$ augmented by a column of ones is determined (Block 1010). The determination of the augmented matrix Z and the pseudoinverse matrix W may be done on an intermittent basis, e.g., at calibration, to reduce computational burdens. The vector of time difference estimates $X_e$ is multiplied by the pseudoinverse matrix W, to produce a scaling vector c, including a slope parameter a and an intercept parameter b (Block 1020). The slope parameter a is then multiplied by the known mass flow $F_c$ to produce a mass flow estimate (Block 1030). It will be appreciated that the mass flow estimate may be further processed; for example, the mass flow estimate may be averaged with other mass flow estimates determined over a time period to produce a filtered mass flow measurement (Block 1040). The intercept parameter b may also be monitored, for example, to detect system changes (Block 1050).

There are several advantages to monitoring the intercept parameter b of the vector c, as will be discussed in detail below. However, it is not necessary to calculate the intercept parameter b in order to generate a mass flow estimate. Equation (2) can be rewritten as:

$$X_e = Y_e a \qquad (5)$$

using no intercept parameter b. Equation (5) may be viewed as an attempt to match the shape of the time difference estimate vector $X_e$ to the shape of the reference time difference vector $Y_e$ without accounting for phase normalization. Equation (5) may work if the time difference estimate vector $Y_e$ and the reference time difference vector $X_e$ are arbitrarily normalized, and may produce better results if all of the phases are normalized by the reference phase before determination of the time difference estimates $X_e$. To solve for the slope parameter a, the following relation may be used:

$$a = Y_e^{-1} X_e. \qquad (6)$$

FIG. 11 illustrates operations 1100 for generating a mass flow estimate without determining the intercept parameter b according to embodiments of the present invention. A pseudoinverse $Y_e^{-1}$ of vector of reference time differences $Y_e$ associated with a known mass flow $F_c$ is determined (Block 1110). The determination of the pseudoinverse $Y_e^{-1}$ may be done on an intermittent basis, e.g., at calibration, to reduce computational burdens. The vector of time difference estimates $X_e$ is multiplied by the pseudoinverse $Y_e^{-1}$ to determine a slope parameter a (Block 1120). The slope parameter a is then multiplied by the known mass flow $F_c$ to produce a mass flow estimate (Block 1130). It will be appreciated that the mass flow estimate may be further processed; for example, the mass flow estimate may be averaged with other mass flow estimates determined over a time period to produce a filtered mass flow measurement (Block 1140).

Figure 12:
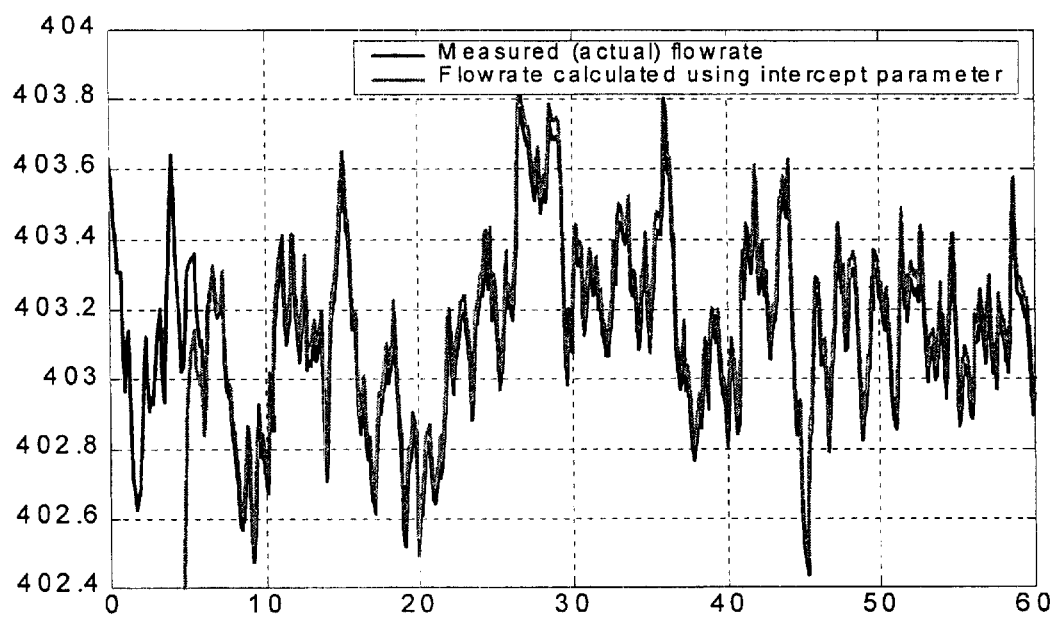
FIGS. 12 and 13 are waveform diagrams illustrating mass flow estimation operations according to the invention.
Figure 13:
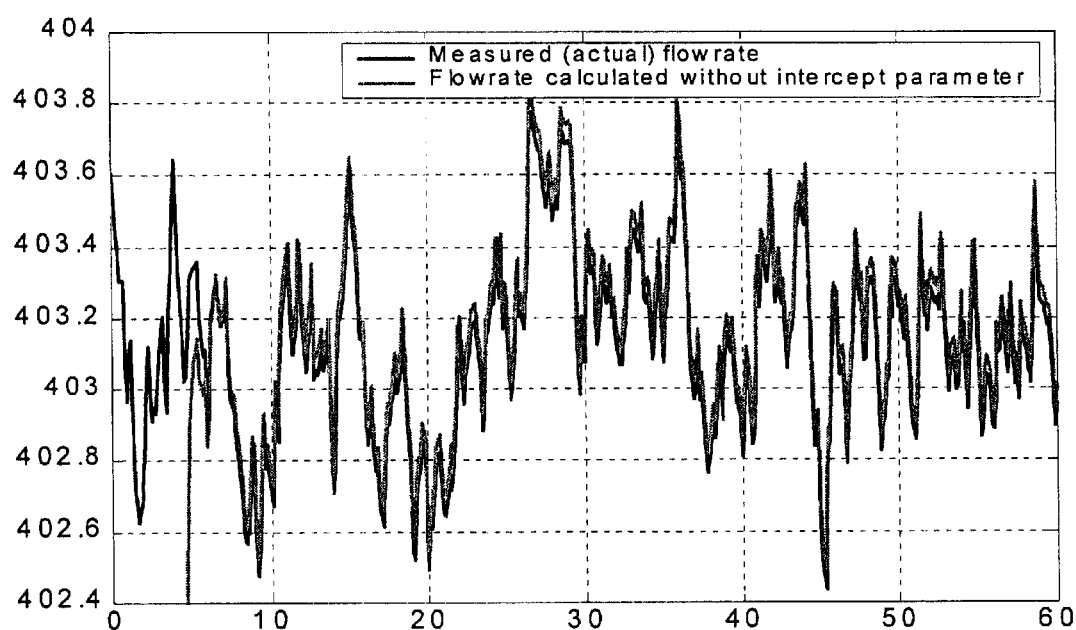

FIGS. 12 and 13 graphically illustrate test results for a prototype Coriolis mass flowmeter according to embodiments of the invention that indicate that determination of the intercept parameter b is not needed to generate mass flow estimates. In particular, FIGS. 12 and 13 illustrates that mass flow estimates generated over time intervals of interest (approximately 10 to approximately 30 seconds) using respective ones of the pseudoinverse methods described above (i.e., with and without determination of the intercept parameter b, respectively) show a similar degree of agreement with experimental mass flow rate measurements for the time intervals obtained using other means.

According to other embodiments of the present invention, a iterative technique may be used to solve for the vector c in place of the pseudoinverse techniques described above. An error equation $$L(k) = X_e(k) - Zc(k-1), \qquad (7)$$

and an associated cost function $$J = \frac{1}{2} L^2 \qquad (8)$$

can be defined. A gradient method can be used to find a solution that reduces the cost function J to a desired level, with the gradient given by:

$$\frac{\partial J}{\partial c} = -LZ. \qquad (9)$$

Small steps may be taken down the gradient towards a minimum value of the cost function J. At a kth step, a new estimate of the vector c(k) is produced using the following relation:

$$c(k) = c(k-1) - \gamma \frac{\partial J}{\partial c} = c(k-1) + \gamma LZ, \quad (10)$$

where the vector $c(k-1)$ represents the result produced by the preceding $k-1$ iteration and $\gamma$ is an adaptive rate for the process. Computations may be repeatedly performed until the cost function J is reduced to a predetermined level. $\gamma$ should be greater than zero and less than 2 to ensure convergence. The value of $\gamma$ generally impacts the rate of convergence and the sensitivity of the iterative process to noise. Generally, the larger the value of $\gamma$, the faster the process converges; however, a large value for $\gamma$ may increase sensitivity to noise. An optimum value for $\gamma$ may be determined experimentally, which a typically value being 0.1.

Equation (10) represents a Least Mean Square (LMS) approach to parameter estimation. A potentially more robust Normalized Least Mean Square (NLMS) version of this adaptive approach may also be used as follows:

$$c(k) = c(k-1) - \gamma \frac{Z^T L(k)}{\alpha + \|Z\|_2^2}, \quad (11)$$

where $$0 < \gamma < 2 \quad (12),$$

and $\alpha$ is a constant that is included to reduce the likelihood of numerical instability if the norm of Z approaches zero. In order to provide convergence for equation (11), equation (12) should be satisfied. The value of a preferably is a small positive value and may be selected based on experimentation.

Figure 14:
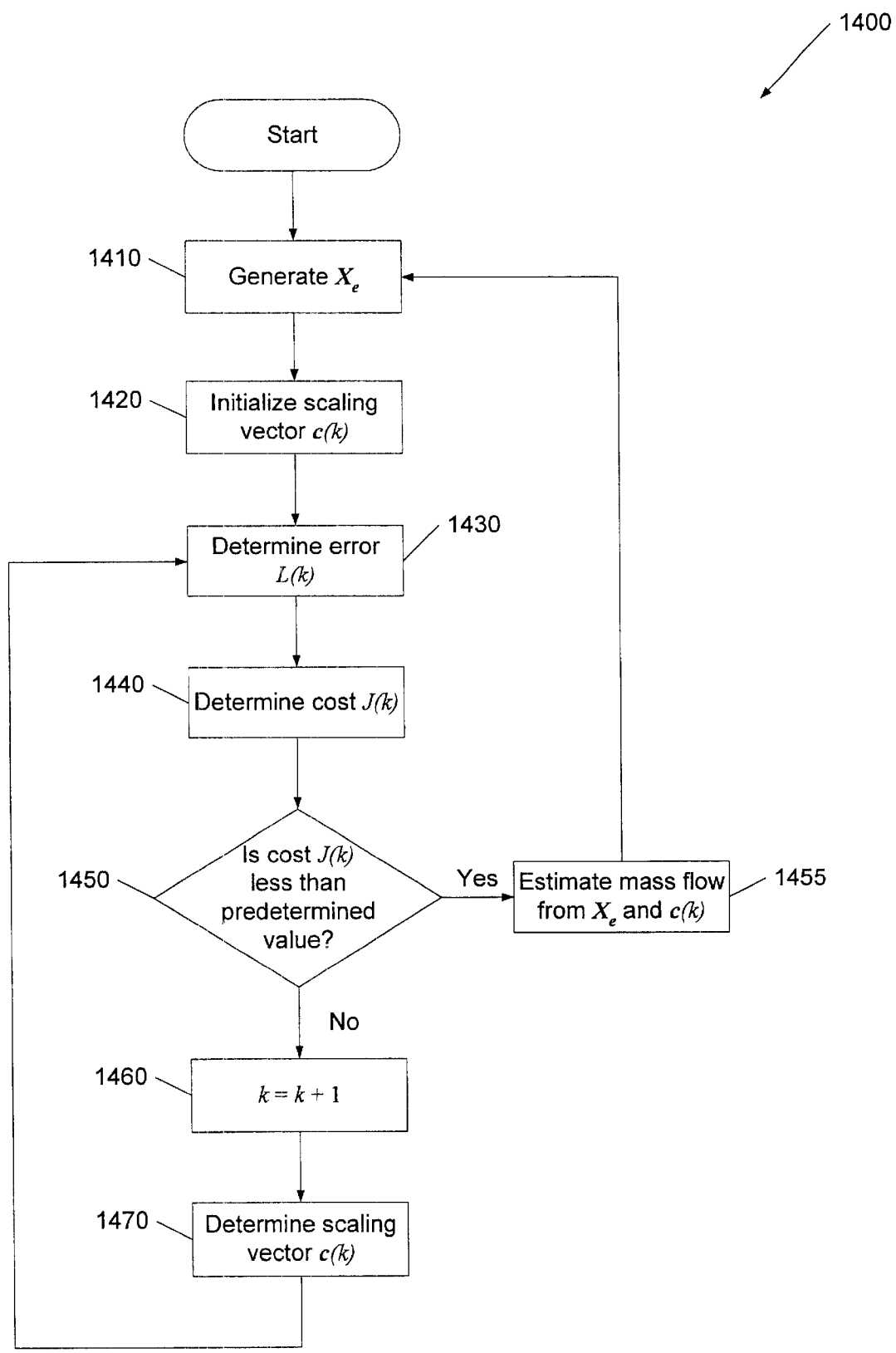
FIG. 14 is a flowchart illustrating operations for iteratively estimating a mass flow scaling vector according to embodiments of the present invention.

FIG. 14 illustrates operations 1400 according to embodiments of the present invention, in which a scaling vector c is iteratively determined along the lines described above. A vector $X_e$ of time difference estimates is generated (Block 1410). An initial scaling vector estimate c(k) is generated (Block 1420). The initial value c(k) may be, for example, zero or a final estimate of a scaling vector c generated from a previous value of $X_e$. Assuming that flow rate does not change drastically between flow measurements, the latter choice may increase the speed of convergence, as the previously estimated value for the scaling vector c should be close to the new value to be determined. An associated error L(k) and cost J(k) are determined, e.g., using equations (7) and (8) (Block 1440). If the cost J(k) is less than a predetermined value, indicating an acceptable accuracy of the scaling vector estimate c(k), an estimate of mass flow may be generated (Blocks 1450, 1455) and a new vector of time difference estimates $X_e$ generated (Block 1410). If not, an updated estimate of the scaling vector c(k) is generated using, for example, equation (10) or equation (11) (Blocks 1460, 1470), and new error and cost function values are computed (Blocks 1430, 1440).

Those skilled in the art will appreciate that operations other than those described with reference to FIG. 14 may be used with the present invention. For example, it will be appreciated that many of the computations may be combined or varied. It will also be appreciated that there are many different iterative techniques that can be used to solve equation (3) beyond the LMS and NLMS techniques described above.

FIGS. 15–19 are flowchart illustrations of exemplary operations according to various embodiments of the present invention. Those skilled in the art will understand that the operations of these flowchart illustrations may be implemented using computer instructions. These instructions may be executed on a computer or other data processing apparatus, such as the data processor 450 of FIG. 4, to create an apparatus (system) operative to perform the illustrated operations. The computer instructions may also be stored as computer readable program code on a computer readable medium, for example, an integrated circuit memory, a magnetic disk, a tape or the like, that can direct a computer or other data processing apparatus to perform the illustrated operations, thus providing means for performing the illustrated operations. The computer readable program code may also be executed on a computer or other data-processing apparatus to cause the apparatus to perform a computer-implemented process. Accordingly, FIGS. 15–19 support apparatus (systems), computer program products and methods for performing the operations illustrated therein.

Figure 15:
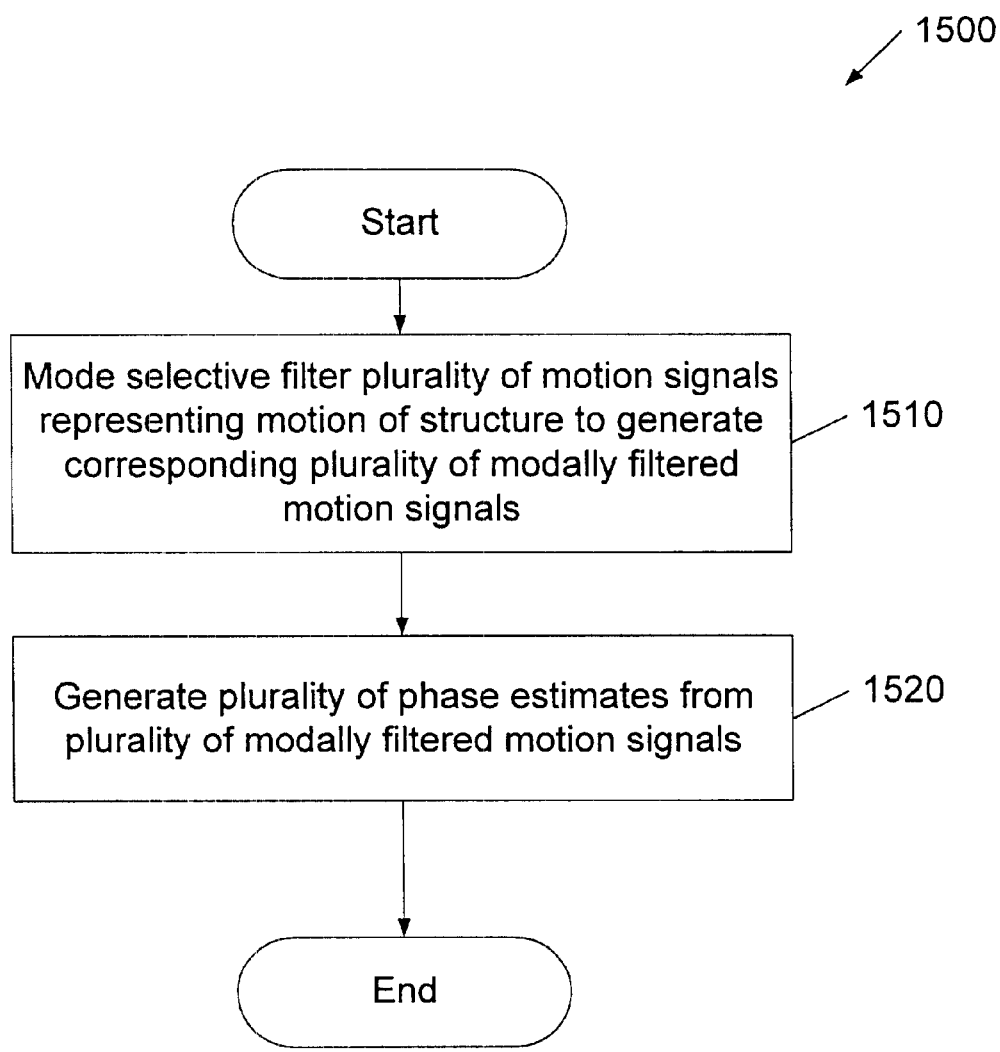
FIG. 15 is a flowchart illustrating operations for generating phase estimates according to embodiments of the invention.

According to embodiments of the present invention illustrated by FIG. 15, operations 1500 for generating phase estimates associated with motion of a structure include mode selective filtering a plurality of motion signals representing motion of the structure to generate a corresponding plurality of mode selective filtered motion signals using, for example, techniques such as those described above with reference to FIG. 6. (Block 1510). A plurality of phase estimates is then generated from the plurality of mode selective filtered motion signals (Block 1520).

Figure 16:
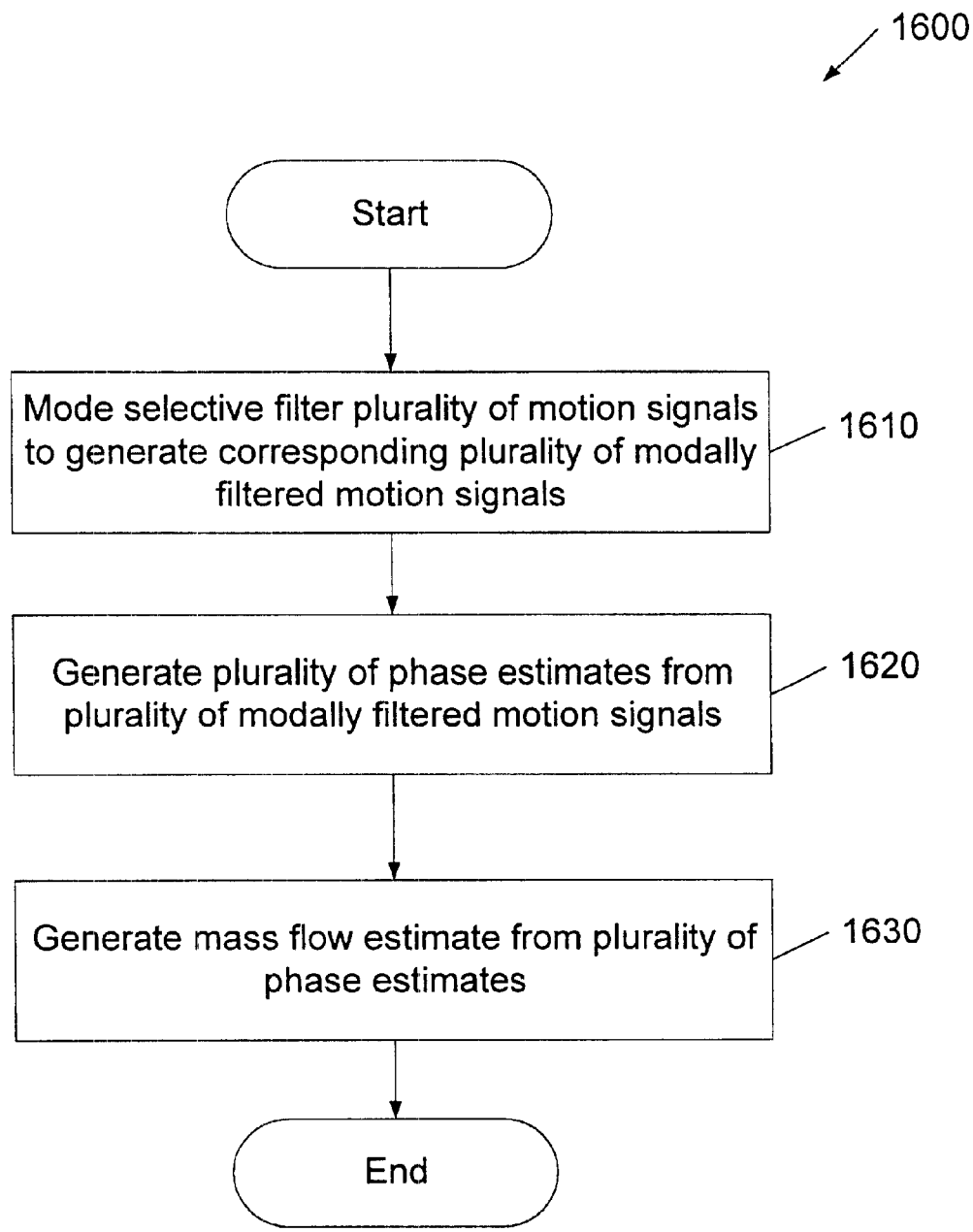
FIG. 16 is a flowchart illustrating operations for estimating mass flow according to other embodiments of the invention.

In exemplary mass flow estimation operations 1600 according to embodiments of the present invention illustrated in FIG. 16, a plurality of motion signals representing motion of a conduit are mode selective filtered to produce a plurality of mode selective filtered motion signals (Block 1610). A plurality of phase estimates is then generated from the plurality of mode selective filtered motion signals (Block 1620), and is used to generate a mass flow estimate (Block 1630).

Figure 17:
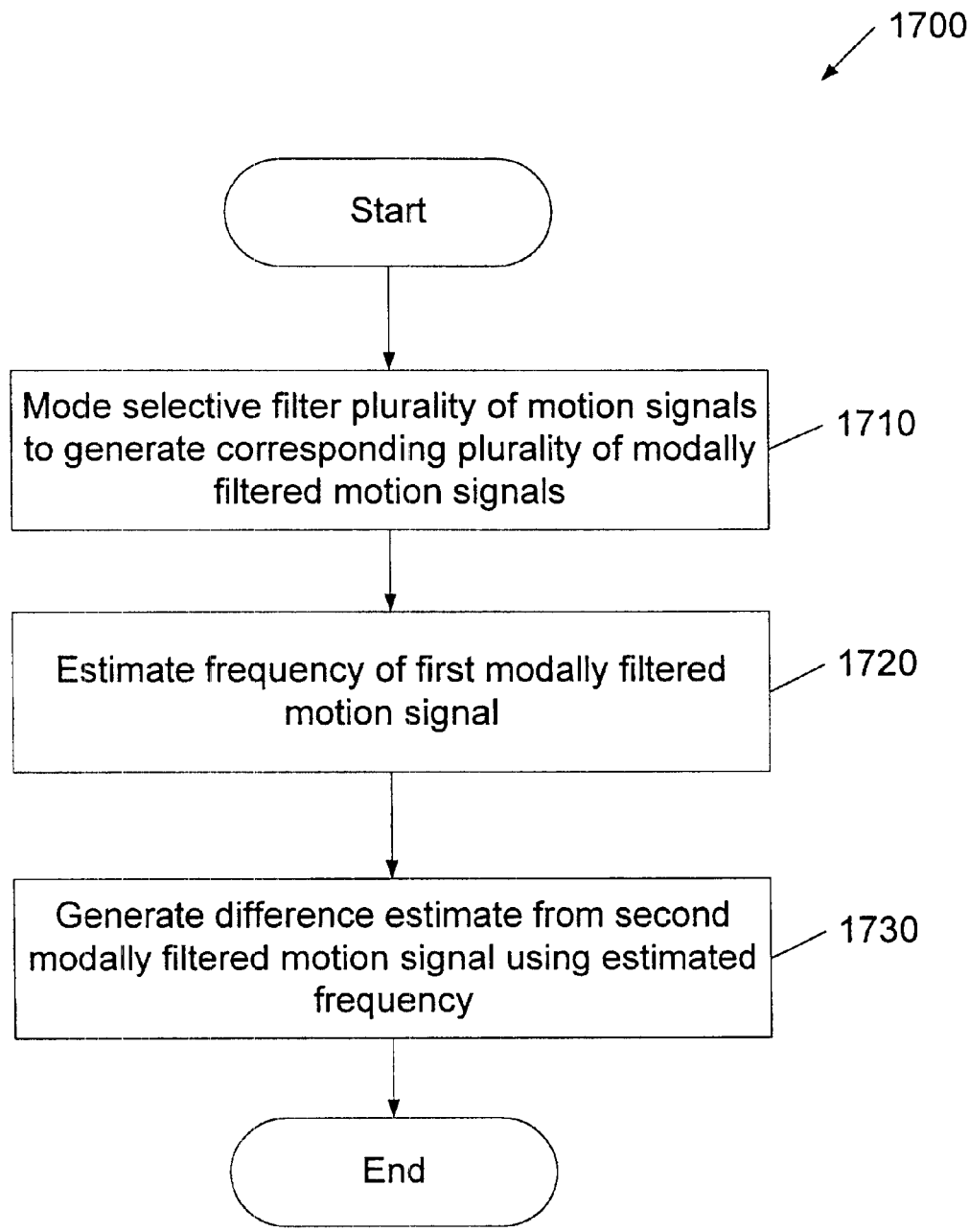
FIG. 17 is a flowchart illustrating operations for generating difference estimates according to embodiments of the invention.

In exemplary difference estimation operations 1700 according to other embodiments of the present invention illustrated in FIG. 17, a plurality of motion signals representing motion of a structure are mode selective filtered to produce a plurality of mode selective filtered motion signals (Block 1710). A frequency of a first mode selective filtered motion signal is determined using, for example, the adaptive notch filtering operations described above with reference to FIG. 7 (Block 1720). A difference estimate, e.g., a phase difference estimate and/or a time difference estimate, is then determined from a second mode selective filtered motion signal using, for example, the demodulation operations described with reference to FIG. 7. (Block 1730).

Figure 18:
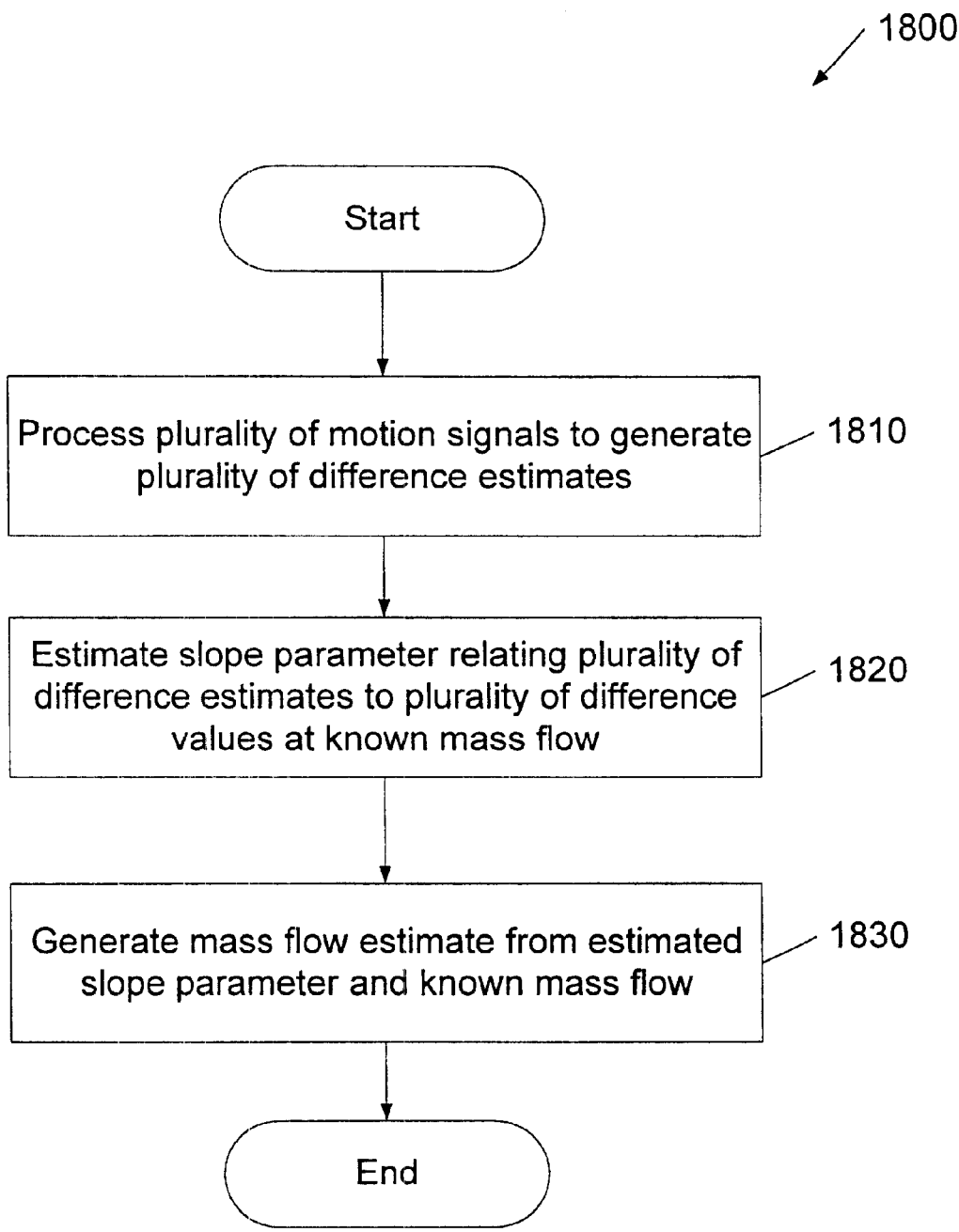
FIG. 18 is a flowchart illustrating operations for estimating mass flow according to embodiments of the invention.

FIG. 18 illustrates Operations 1800 for generating a mass flow estimate according to yet other embodiments of the present invention. A plurality of motion signals representing motion of a conduit are processed to generate a plurality of difference estimates, for example, time difference estimates or phase difference estimates (Block 1810). A slope parameter relating the plurality of difference estimates to a plurality of reference difference values corresponding to a known mass flow is then estimated (Block 1820), and a mass flow estimate is generated from the estimated slope parameter and the known mass flow (Block 1830). These operations may be implemented using, for example, the operations described above with reference to FIGS. 10 and 1.

Figure 19:
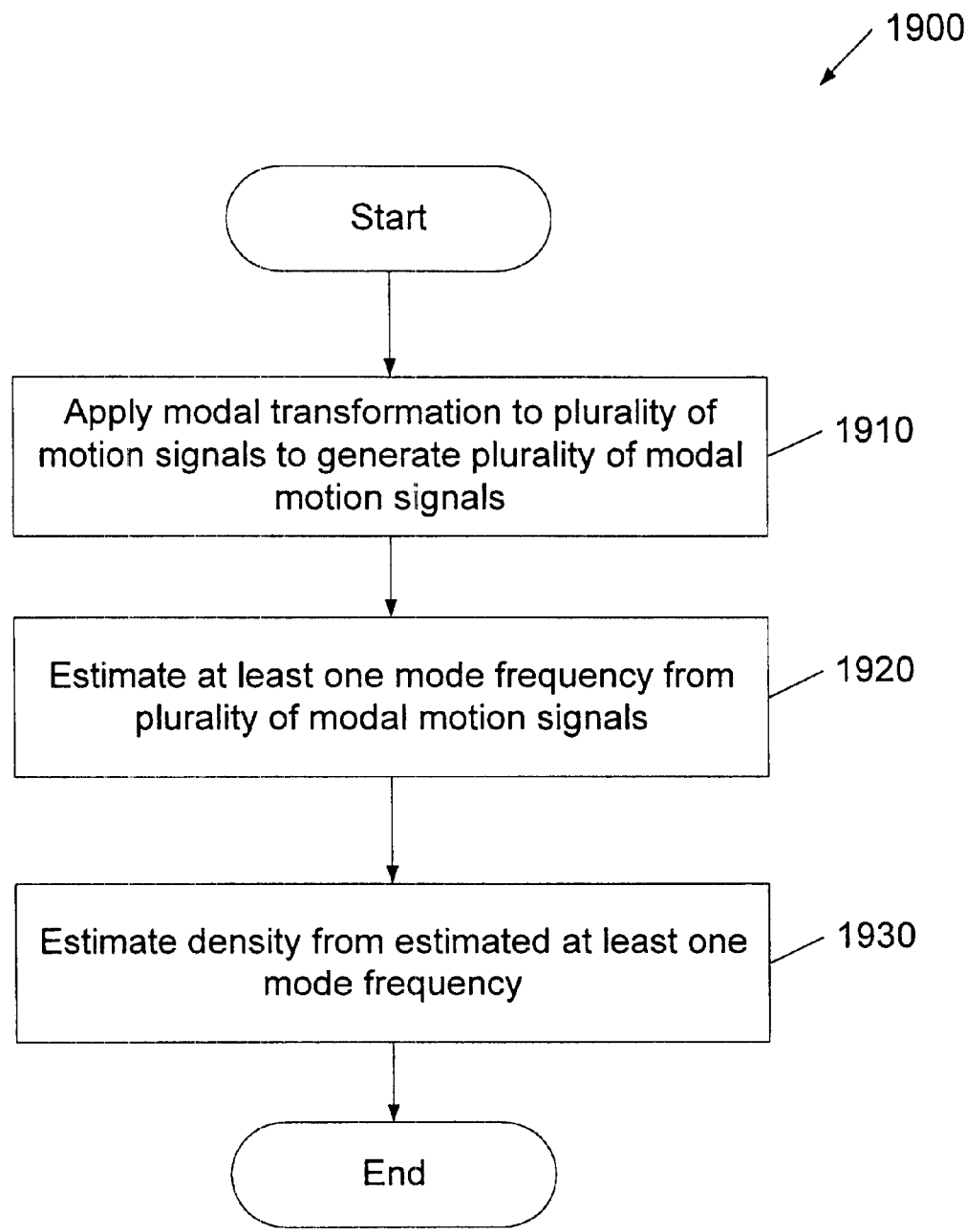
FIG. 19 is a flowchart illustrating operations for estimating density according to embodiments of the invention.

In exemplary density estimation operations 1900 according to other embodiments of the present invention illustrated in FIG. 19, a modal transformation is applied to a plurality of motion signals representing motion of a material-containing vessel to generate at least one modal motion signal representing corresponding motion in a modal domain defined by at least one vibrational mode of the vessel (Block 1910). At least one mode frequency is then determined from the at least one modal motion signal (Block 1920), and a density of the material in the vessel is determined from the at least one mode frequency estimate (Block 1930), for example, as described above with reference to FIG. 6.

Figure 20A:
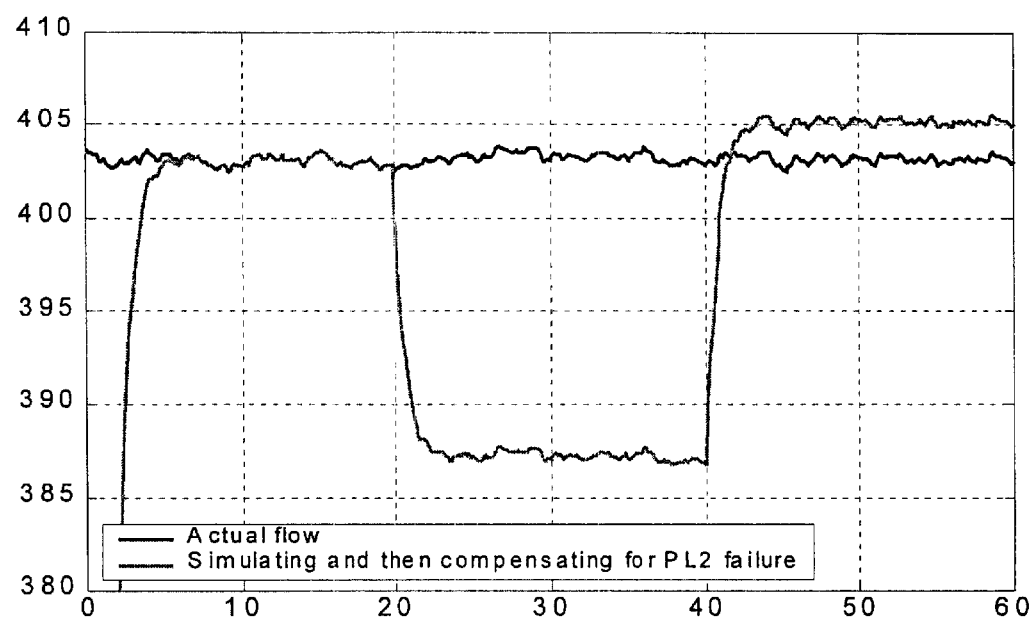
FIGS. 20A, 20B and 21–27 are waveform diagrams illustrating exemplary effects of system changes according to aspects of the invention.
Figure 20B:
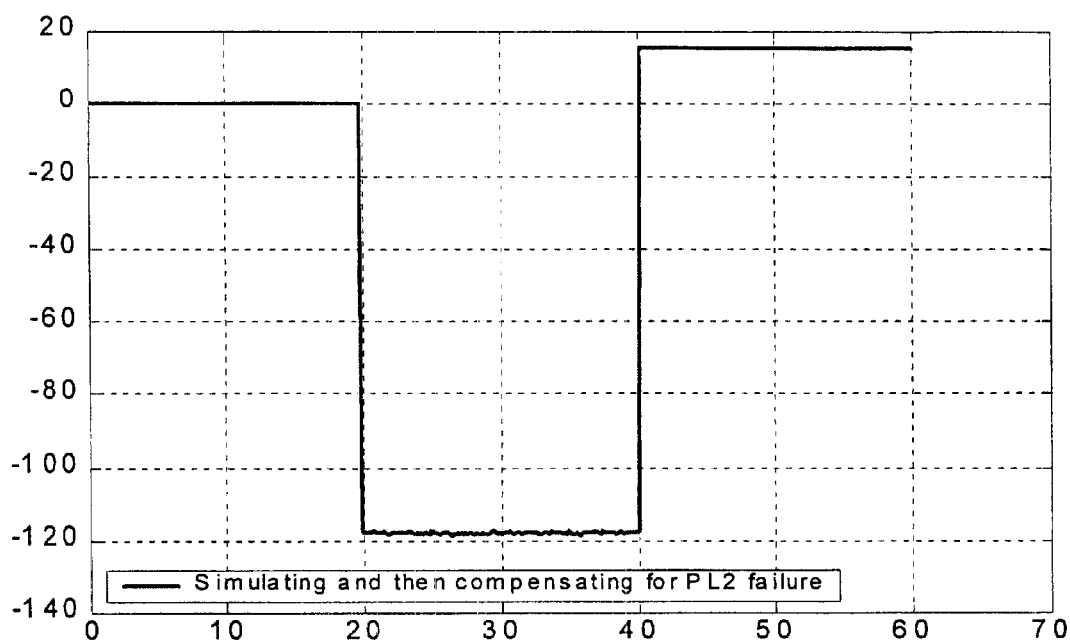
Figure 21:
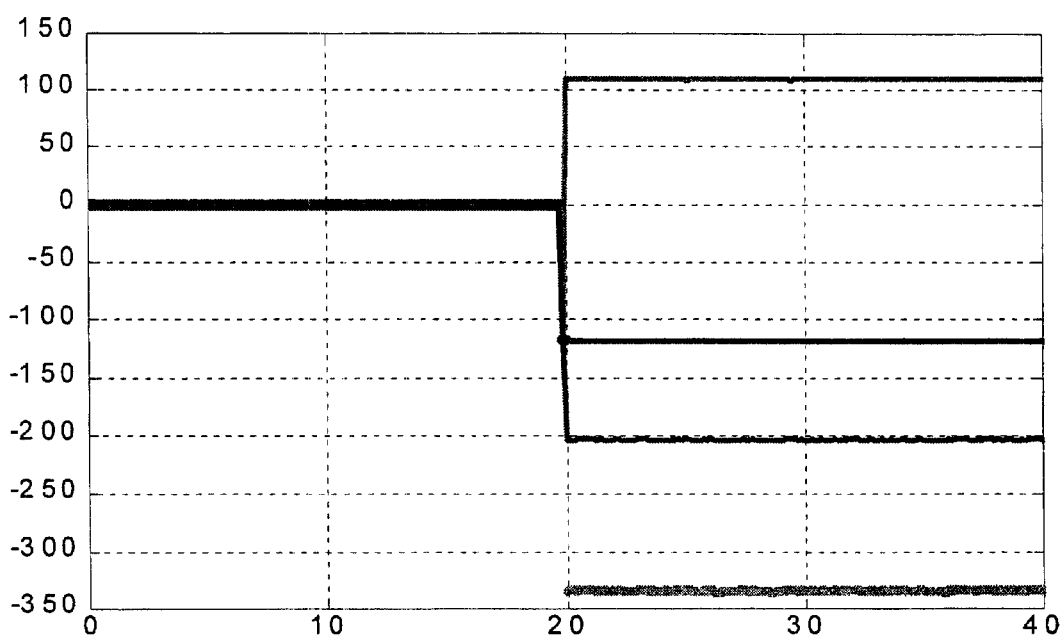

Monitoring of Spatial Intercept or Other Correlation Measures to Detect System Status As mentioned above with reference to FIGS. 10 and 11, although the intercept parameter b of the scaling vector c is not needed for mass flow estimation, it may be useful for detecting system changes, such as motion transducer failure, changes in mounting conditions and the like. Potential usefulness of the intercept parameter is illustrated by the graphs of FIGS. 20A–20B and 21. FIGS. 20A–20B graphically illustrates simulated changes in computed mass flow rate and spatial intercept parameter, respectively, for failures of a motion transducer at approximately 20 seconds, the failure of particular transducer being simulated by zeroing out the corresponding elements in the vectors of time difference estimates produced by the transducer. As shown in FIG. 20A, loss of a transducer produces a change in computed mass flow rate, which might be erroneously interpreted as an actual change in mass flow rate.

The change in the intercept parameter may be used, according to embodiments of the present invention, to trigger a fault correction scheme. For example, as shown in FIGS. 20A and 20B, the pseudoinverse W of an augmented matrix Z may be recalculated by striking the row corresponding to the failed transducer, and then used to generate new mass flow estimates. As shown in FIG. 20A, where such a correction is implemented for mass flow estimates beginning at approximately 40 seconds, improved accuracy may be achieved. In particular, for the example shown, an error of 0.5% is achieved with such a correction in comparison to the 4% error occurring without such a correction.

Figure 22:
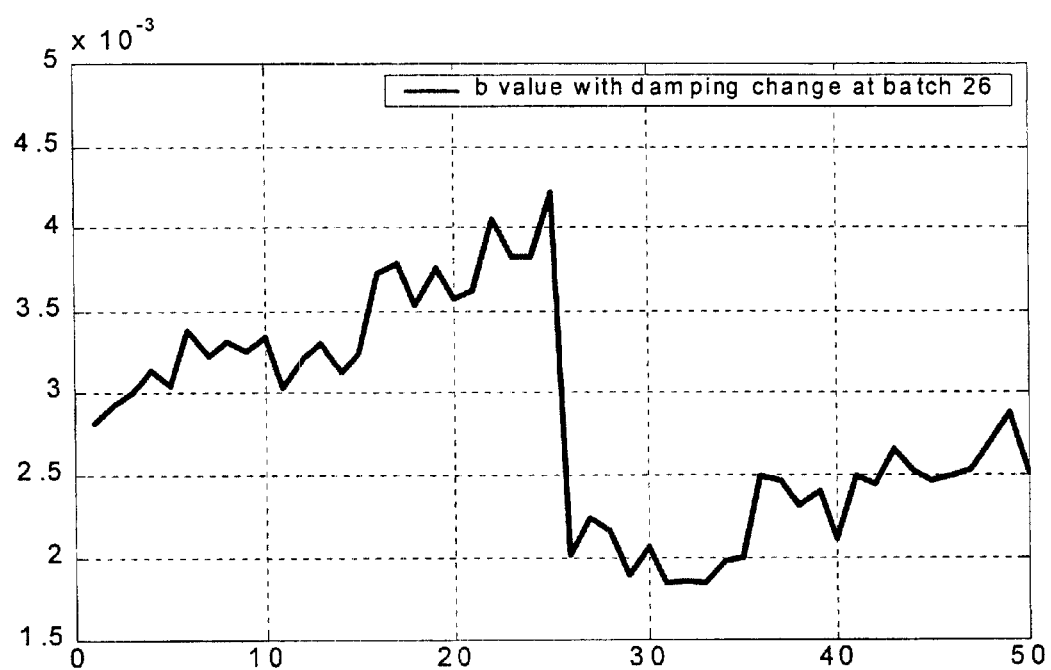

As shown in FIG. 21, which illustrates intercept parameter values for failures of each member of a group of five motion transducers, failures of a motion transducer may be signaled by a corresponding large change in the intercept parameter, a phenomenon which typically would not occur in response to a mere change in mass flow. Other system changes, such as changes in mounting or other conditions, may also be identified by changes in the intercept parameter. In particular, FIG. 22 illustrates changes in the intercept parameter for a prototype Coriolis mass flow meter after damping is added to the structure of the meter.

The intercept parameter is one of a variety of different correlation measures that may be used to detect system changes according to embodiments of the present invention. In general, once a scaling vector c has been calculated, equation (3) above can be applied to give a vector of time differences $X_{est}$, which is a least square fit of a "measured" vector of time differences $X_e$ (produced as described above) to a basis vector:

$$X_{est} = Zc. \tag{13}$$

The predicted vector of time differences $X_{est}$ may be compared to the measured vector of time difference estimates $X_e$ to produce a correlation measure that can be used for various purposes. The comparison can be done intermittently or at each computation of mass flow.

In embodiments of the present invention, a coefficient of correlation r may generated from the predicted vector of time differences $X_{est}$ and used to detect system changes. The coefficient of correlation r is a dimensionless scalar quantity between +1 and −1, and uses a quantity $\overline{X}$, which is an average of the time difference estimates $X_e$:

$$\overline{X} = \text{mean}(X_e) = \sum_{i=1}^{N} \frac{X_{ei}}{N}, \tag{14}$$

where N is the number of data points, e.g., the number of motion transducer signals. The correlation coefficient r may be defined as a ratio of explained variation over total variation:

$$R = \pm \sqrt{\frac{explained\,variation}{total\,variation}} = \pm \sqrt{\frac{\sum (X_{est} - \overline{X})^2}{\sum (X_e - \overline{X})^2}}. \tag{15}$$

Figure 23:
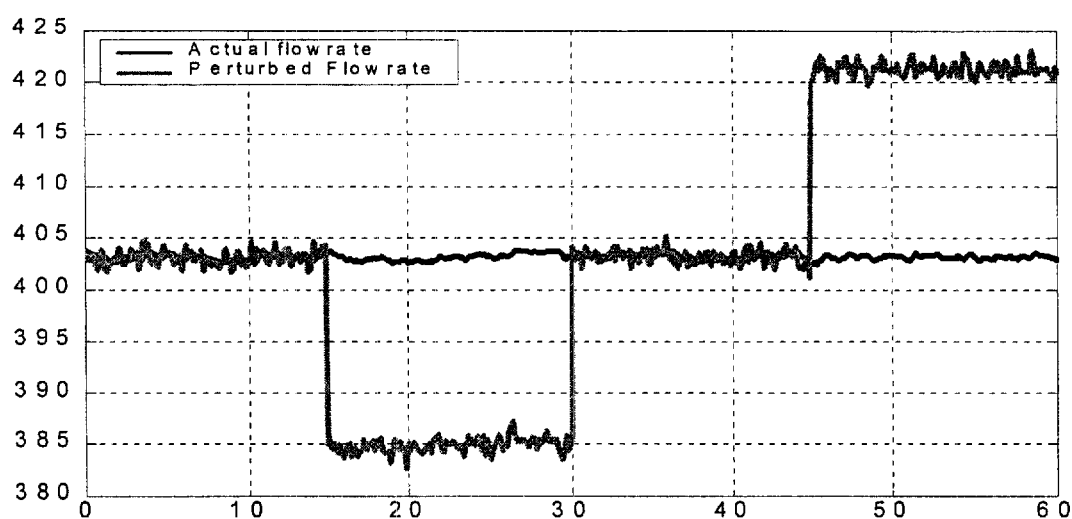

FIG. 23 illustrates how such a correlation coefficient may be used, in particular, in detecting transducer failure. Mass flow is estimated over a first time period of 0 to 15 seconds using vectors $X_e$ of time difference estimates generated from motion signals produced by transducers #1–#5. Subsequently produced vectors $X_e$ of time difference estimates are then perturbed by zeroing out motion signal values corresponding to one motion transducer (#2) from 15 to 30 seconds, simulating failure of that transducer for that time period. Vectors $X_e$ of time difference estimates are again perturbed from 45 to 60 seconds by doubling the motion signal value associated with the #2 transducer, simulating a gain change in the transducer or a "noisy" transducer signal. As seen in FIG. 23, the mass flow estimate is reduced approximately 20 lbm/min low when the #2 transducer input is zeroed and increased approximately 15 lbm/min with the motion signal input doubled.

Figure 24:
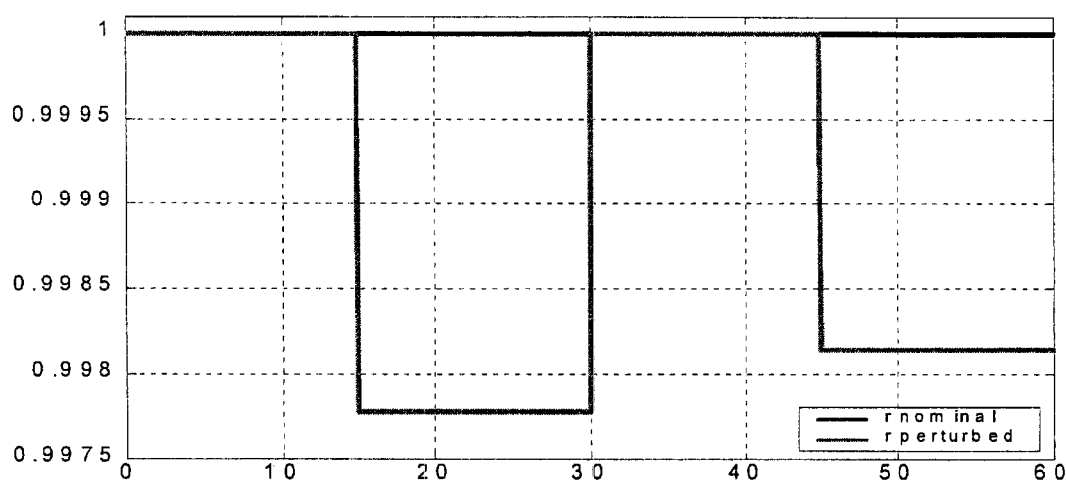

With standard flow measurement techniques, it may be difficult to tell whether such changes are attributable to actual mass flow changes or measurement failures. However, in a manner similar to that described above with reference to the intercept parameter, the correlation coefficient r may be used to detect such system changes. As shown in FIG. 24, which illustrates behavior of the correlation coefficient r over the same time interval as FIG. 23, the correlation coefficient r may show a relatively large change in value with a failed (zeroed) or noisy motion signal.

Error of estimate is another correlation measure that may be used for detecting system status. A standard error of estimate $s_{x,y}$ may be expressed as:

$$s_{x,y} = \sqrt{\frac{\sum (X_e - X_{est})^2}{N}} \tag{16}$$

Figure 25:
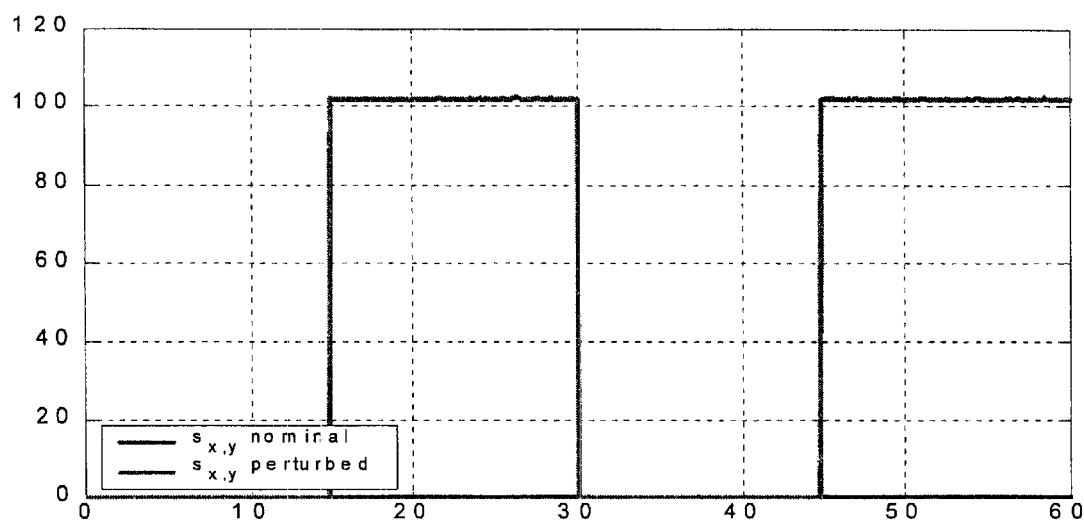

As shown in FIG. 25, which shows behavior of the standard error of estimate $s_{x,y}$ for the time interval of FIGS. 23 and 24, the standard error of estimate $s_{x,y}$ may exhibit large changes for the system changes described above (it will be noted that sampling theory indicates that for a small number of transducer inputs (e.g., 6), greater accuracy may be achieved by replacing the N in the denominator with N−2.)

Other properties of the error of estimate measure can be exploited to determine the source of a failure, such as the identity of a particular failed transducer. The standard error of estimate may be viewed as being analogous to the standard deviation of a data set, i.e., one can expect that 99.7% of the time, the error of estimate for a time difference estimate will be within three times the standard error estimate $s_{x,y}$ of the predicted vector of time differences $X_{est}$. Accordingly, the respective errors of estimate for respective time difference estimates associated with respective transducers can be checked to see if they are within a predetermined multiple (e.g., within three times) of the standard error of the estimate. Such a test may be expressed as the following inequality:

$$X_{est} - K^* s_{x,y} \leq X_e \leq X_{est} + K^* s_{x,y}, \qquad (17)$$

which can be rearranged to give:

$$-K^* s_{x,y} \leq X_e - X_{est} \leq +K^* s_{x,y} \qquad (18).$$

Figure 26:
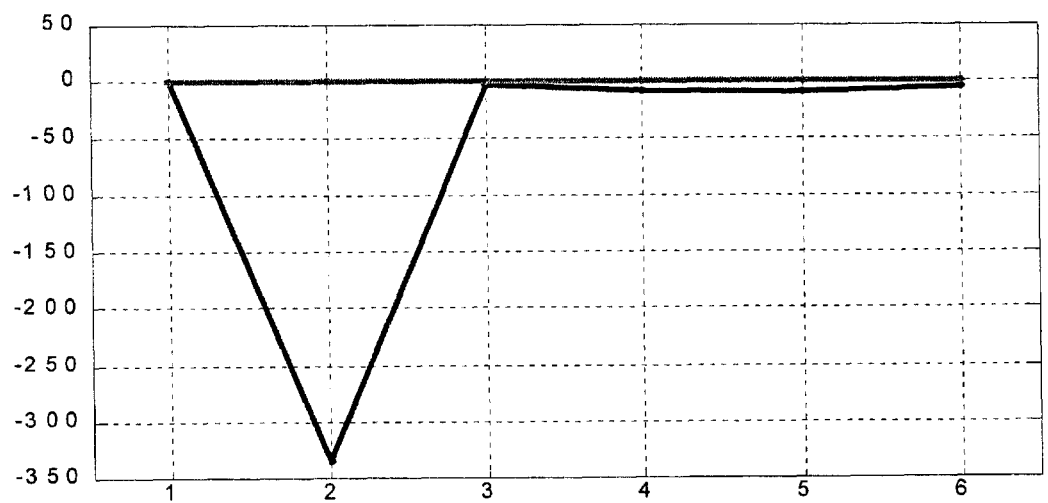

To identify a failed transducer, for example, the criterion of equations (17) and (18) can be applied to each component of each generated vector of time difference estimates. An error $(X_e - X_{est})$ of a particular time difference estimate $X_e$ associated with a failed transducer will typically be many times the standard error of estimate. This is illustrated in FIG. 26, which shows error $(X_e - X_{est})$ for a failed transducer #2 of a group of transducers in relation to the standard error of estimate for the group (the values of which are normalized for convenience by subtracting out a nominal vector). As shown, the error associated with transducer #2 is well outside the standard error of estimate bounds for the group (which, for the example shown, is approximately ±0.07, too small to be seen on the plot of FIG. 26).

Figure 27:
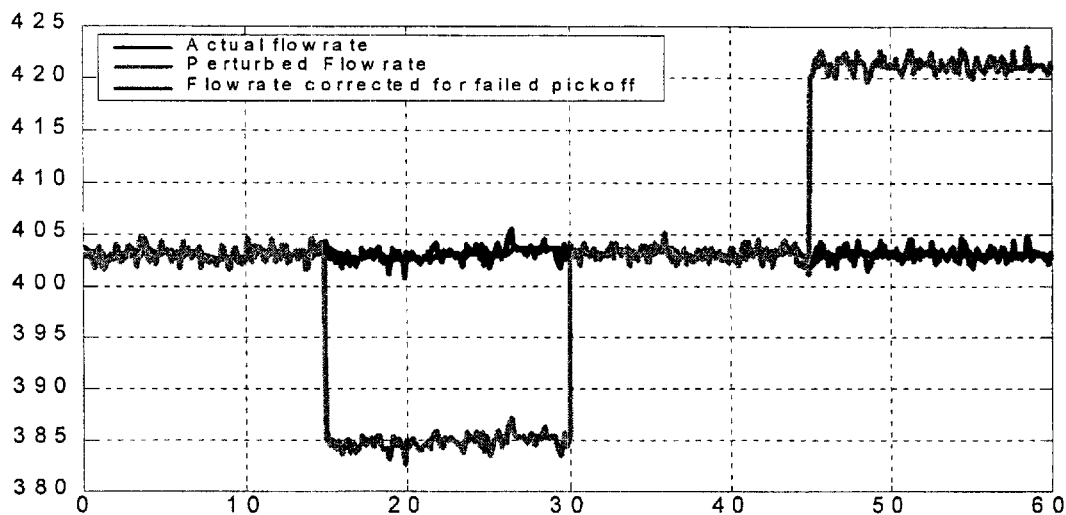

It is also possible to correct the computed mass flow rate for a failed transducer once it has been identified. For example, the augmented matrix Z may be reformulated by deleting the row associated with the failed transducer. A new pseudoinverse matrix W may then be formed by inverting the reformulated augmented matrix Z. Mass flow rate may then be estimated premultiplying a reduced dimension vector of time difference estimates $X_e$ in which the row associated with the failed transducer by the new pseudoinverse matrix W is zeroed out. FIG. 27 illustrates such correction of a mass flow rate estimate.

According to embodiments of the present invention, a flowmeter apparatus may monitor an intercept parameter, correlation coefficient, standard error of estimate or other correlation measure to detect system status. For example, upon detection of a large change in the intercept parameter, a particular failed transducer may be identified and the modal selective filter and/or the pseudoinverse matrix used by the apparatus to generate difference estimates may be recomputed to compensate for the failed transducer. Similarly, an error of a time difference estimate associated with a particular transducers moving outside of a range defined by a standard error of estimate may be used to detect transducer failure, and thus trigger corrective action.

Figure 28:
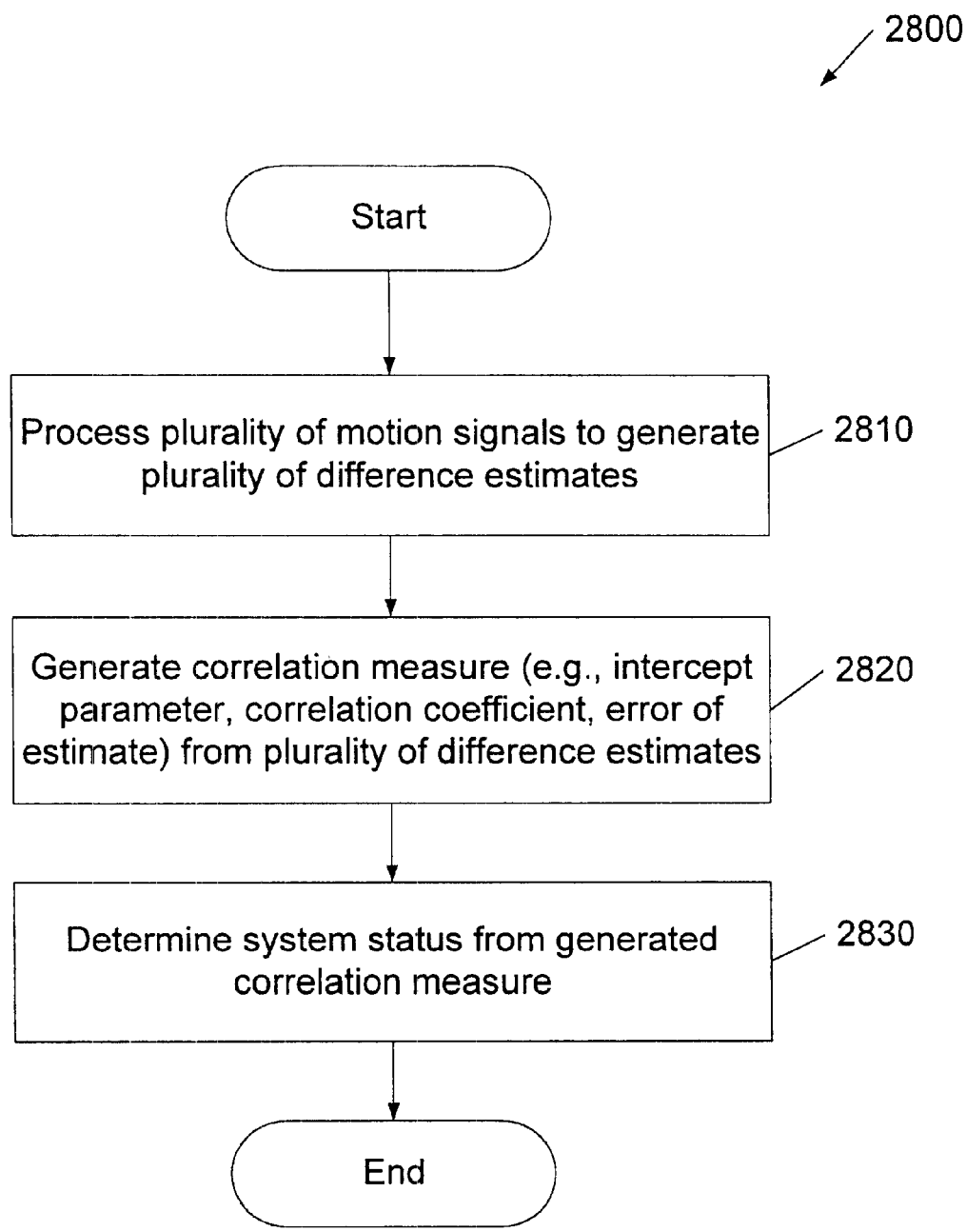
FIGS. 28–30 are flowcharts illustrating operations for monitoring system status and compensating for system changes according to embodiments of the invention.

FIG. 28 illustrates operations 2800 for detecting system status according to embodiments of the present invention. A plurality of difference estimates, e.g., a vector of time difference estimates $X_e$ as described above, is generated (Block 2810). A correlation measure, such as an intercept parameter, a correlation coefficient or an error of estimate is determined (Block 2820). System status is determined from the determined correlation measure (Block 2830).

Figure 29:
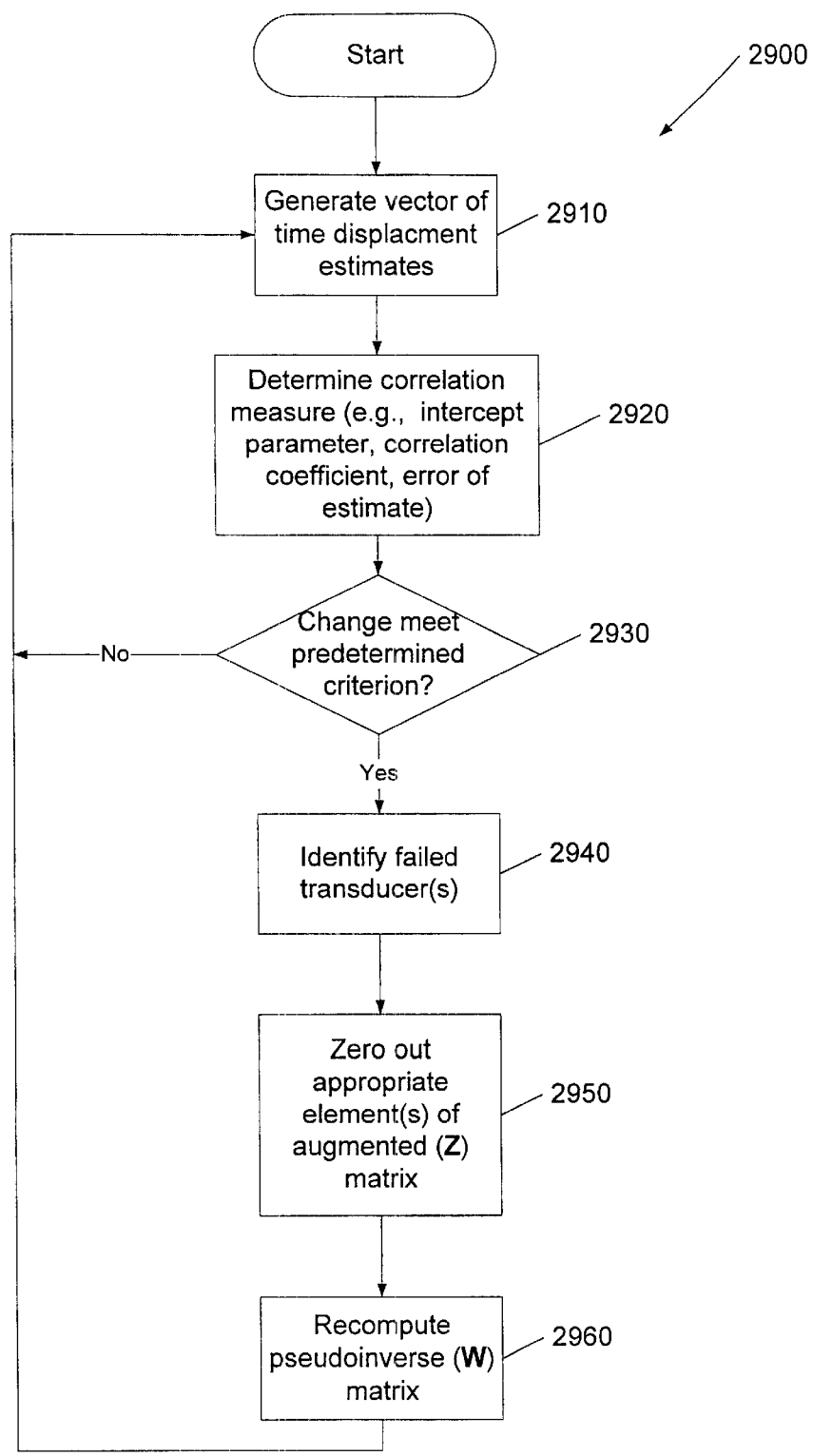

FIG. 29 illustrates exemplary operations 2900 according to other embodiments of the present invention. A vector of time difference estimates $X_e$ is generated (Block 2910). A correlation measure, such as an intercept parameter, a correlation coefficient or an error of estimate, is determined (Block 2920). If a change in the correlation measure meets a predetermined criterion, a failed transducer is identified (Blocks 2930, 2940). After identifying the failed transducer, appropriate elements of the augmented matrix Z may be zeroed out, and the pseudoinverse matrix W may be recomputed for use in subsequent mass flow and other computations (Blocks 2950, 2960, 2910). In this manner, input from the failed transducer may be excluded from subsequent mass flow estimates.

Figure 30:
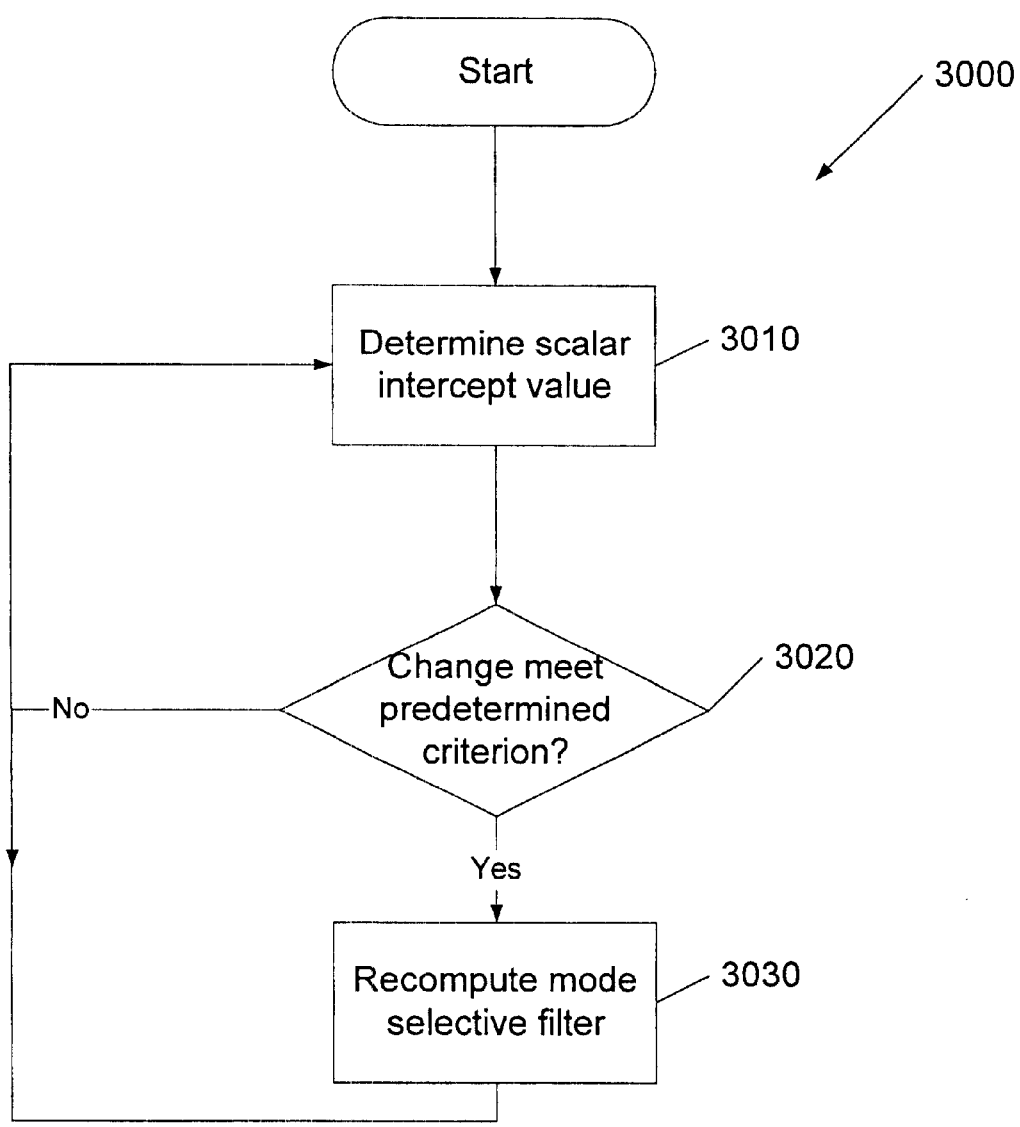

Other corrective action may be taken based on a correlation measure. For example, in exemplary operations 3000 according to embodiments of the present invention illustrated in FIG. 30, an intercept parameter is monitored (Block 3010) and, if a change in the intercept parameter meets a predetermined criterion, the apparatus may recompute the mode selective filter it uses in generating mass flow estimates (Blocks 3020, 3030). A variety of change criteria may be used, such as criteria based on maximum deviation of the intercept parameter from an initial value, average deviation of the intercept parameter over a predetermined time interval, and the like.

Those skilled in the art will appreciate that the present invention may be implemented a number of other ways than the embodiments described herein. For example, computations described herein may be implemented as separate computations, or may be combined into one or more computations that achieve equivalent results. The functions described herein may, in general, be implemented using digital and/or analog signal processing techniques. Those skilled in the art will also appreciate that, although the present invention may be embodied within an apparatus such as a Coriolis mass flowmeter, or as methods which may be performed by such apparatus, the present invention may also be embodied in a apparatus configured to operate in association with a flowmeter or sensor apparatus, such as in process control apparatus. It will also be appreciated that the present invention may be embodied in an article of manufacture in the form of computer-readable instructions or program code embodied in a computer readable storage medium such as a magnetic disk, integrated circuit memory device, magnetic tape, bubble memory or the like. Such computer program code may be executed by a computer or other data processor and executed responsive to motion signals supplied from motion transducers operatively associated with a structure, such as a conduit or other vessel.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of estimating mass flow of a material in a conduit, the method comprising the steps of:
    mode selective filtering a plurality of motion signals representing motion of the conduit to generate a plurality of mode selective filtered motion signals such that the mode selective filtered motion signals preferentially represent motion associated with a vibrational mode of the conduit;
    generating a plurality of phase estimates from the plurality of mode selective filtered motion signals; and
    generating a mass flow estimate from the plurality of phase estimates.

2. A method according to claim 1, wherein said step of generating a plurality of phase estimates comprises the step of generating the plurality of phase estimates using a phase reference derived from one of the plurality of mode selective filtered motion signals.

3. A method according to claim 1, wherein said step of applying a mode selective filter comprises the steps of:
   applying a modal transformation to the plurality of motion signals to generate a plurality of modal response signals in a modal coordinate domain; and
   applying a mode selective transformation to the plurality of modal response signals to generate the plurality of mode selective filtered motion signals.

4. A method according to claim 1, wherein said step of generating a plurality of phase estimates comprises the steps of:
   estimating a frequency of a mode selective filtered motion signal of the plurality of mode selective filtered motion signals;
   generating quadrature first and second reference signals based on the estimated frequency; and
   generating the plurality of phase estimates from the plurality of mode selective filtered motion signals and the first and second reference signals.

5. A method according to claim 4, wherein said step of generating the plurality of phase estimates from the plurality of mode selective filtered motion signals and the first and second reference signals comprises the steps of:
   multiplying a mode selective filtered motion signal by respective ones of the first and second reference signals to generate respective real and imaginary component signals of the mode selective filtered motion signal; and
   estimating an arctangent of a quotient of the real and imaginary component signals of the mode selective filtered motion signal to generate a phase estimate.

6. A method according to claim 1, wherein said step of generating a mass flow estimate comprises the steps of:
   generating a plurality of time difference estimates from the plurality of phase estimates; and
   generating the mass flow estimate from the plurality of time difference estimates.

7. A method according to claim 6, wherein said step of generating a plurality of time difference estimates from the plurality of phase estimates comprises the step of dividing the plurality of phase estimates by a mode frequency to generate a plurality of time difference values.

8. A method according to claim 7, wherein said step of generating a plurality of time difference estimates from the plurality of phase estimates further comprises the step of applying a plurality of zero-flow reference time differences to the plurality of time difference values to generate the plurality of time difference estimates.

9. A method according to claim 7, wherein said step of generating a plurality of time difference estimates from the plurality of phase estimates comprises correcting the plurality of phase estimates using a plurality of zero flow phase values.

10. A method according to claim 7, wherein said step of mode selective filtering comprises the step of applying a modal transformation to the plurality of motion signals to generate a modal motion signal in a modal coordinate domain, and wherein the method further comprises the step of estimating the mode frequency from the modal motion signal.

11. A method according to claim 10, further comprising the step of estimating density of material in the conduit from the estimated mode frequency.

12. A method according to claim 6, wherein said step of estimating mass flow from the plurality of time difference estimates comprises the steps of:
   estimating a slope parameter of a scaling function that relates the plurality of time difference estimates to a plurality of reference time differences representing motion of the conduit at a known mass flow; and
   generating a mass flow estimate from the estimated slope parameter and the known mass flow.

13. A method according to claim 12, wherein said step of estimating a slope parameter comprises the step of multiplying the plurality of time difference estimates by a pseudoinverse of the plurality of reference time differences to estimate the slope parameter.

14. A method according to claim 12, wherein said step of estimating a slope parameter comprises the steps of:
   generating an augmented matrix including the plurality of reference time differences; and
   multiplying the plurality of time difference estimates by a pseudoinverse of the augmented matrix to determine the slope parameter.

15. A method according to claim 12, wherein said step of estimating a slope parameter comprises the step of iteratively estimating the scaling function.

16. A method according to claim 15, wherein said step of iteratively estimating comprises the step of applying a Least Mean Square (LMS) estimation procedure.

17. A method according to claim 12, wherein said step of estimating a slope parameter is preceded by the step of processing a plurality of motion signals representing motion of the conduit at the known mass flow to generate the plurality of reference time differences.

18. A method according to claim 12, further comprising the step of estimating an intercept parameter of the scaling function.

19. A method according to claim 18, further comprising the step of determining a system status from the intercept parameter.

20. An apparatus, comprising:
   a conduit configured to contain a material;
   a plurality of motion transducers operatively associated with the conduit and operative to produce a plurality of motion signals representing motion of the conduit; and
   a signal processing circuit that receives the plurality of motion signals, mode selective filters the plurality of motion signals to generate a plurality of mode selective filtered motion signals such that the mode selective filtered motion signals preferentially represent motion associated with a vibrational mode of the conduit, generates a plurality of phase estimates from the plurality of mode selective filtered motion signals, and generates a mass flow estimate from the plurality of phase estimates.

21. An apparatus according to claim 20, wherein the signal processing circuit generates the plurality of phase estimates using a phase reference derived from one of the plurality of mode selective filtered motion signals.

22. An apparatus according to claim 20, wherein the signal processing circuit applies a modal transformation to the plurality of motion signals to generate a plurality of modal response signals in a modal coordinate domain and applies a mode selective transformation to the plurality of modal motion signals to generate the plurality of mode selective filtered motion signals.

23. An apparatus according to claim 20, wherein the signal processing circuit estimates a frequency of a mode selective filtered motion signal of the plurality of mode selective filtered motion signals, generates quadrature first and second reference signals based on the estimated frequency, and generates the plurality of phase estimates from the plurality of mode selective filtered motion signals and the first and second reference signals.

24. An apparatus according to claim 20, wherein the signal processing circuit generates a plurality of time difference estimates from the plurality of phase estimates and generates the mass flow estimate from the plurality of time difference estimates and an estimated mode frequency.

25. An apparatus according to claim 24, wherein the signal processing circuit applies a plurality of zero-flow reference time differences to the plurality of time difference values to generate the plurality of time difference estimates.

26. An apparatus according to claim 24, wherein the signal processing circuit applies a modal transformation to the plurality of motion signals to generate a modal motion signal in a modal coordinate domain, and estimates the mode frequency from the modal motion signal.

27. An apparatus according to claim 26, wherein the signal processing circuit estimates density of material in the conduit from the estimated mode frequency.

28. An apparatus according to claim 24, wherein the signal processing circuit estimates a slope parameter of a scaling function that relates the plurality of time difference estimates to a plurality of reference time differences representing motion of the conduit at a known mass flow and generates the mass flow estimate from the estimated slope parameter and the known mass flow.

29. An apparatus according to claim 28, wherein the signal processing circuit multiplies the plurality of time difference estimates by a pseudoinverse of the plurality of reference time differences to estimate the slope parameter.

30. An apparatus according to claim 28, wherein the signal processing circuit generates an augmented matrix including the plurality of reference time differences and multiplies the plurality of time difference estimates by a pseudoinverse of the augmented matrix to determine the slope parameter.

31. An apparatus according to claim 28, wherein the signal processing circuit iteratively estimates the scaling function.

32. An apparatus according to claim 28, wherein the signal processing circuit is operative to process a plurality of motion signals representing motion of the conduit at the known mass flow to generate the plurality of reference time differences.

33. An apparatus according to claim 28, wherein the signal processing circuit is further operative to estimate an intercept parameter of the scaling function and to determine a system status from the intercept parameter.

34. An apparatus for processing a plurality of motion signals representing motion of a material-containing conduit, the apparatus comprising:
means for mode selective filtering the plurality of motion signals to generate a plurality of mode selective filtered motion signals such that the mode selective filtered motion signals preferentially represent motion associated with a vibrational mode of the conduit;
means for generating a plurality of phase estimates from the plurality of mode selective filtered motion signals; and
means for generating a mass flow estimate from the plurality of phase estimates.

35. An apparatus according to claim 34, wherein the means for generating a plurality of phase estimates comprises means for generating the plurality of phase estimates using a phase reference derived from one of the plurality of mode selective filtered motion signals.

36. An apparatus according to claim 34, wherein the means for applying a mode selective filter comprises:
means for applying a modal transformation to the plurality of motion signals to generate a plurality of modal response signals in a modal coordinate domain; and
means for applying a mode selective transformation to the plurality of modal response signals to generate the plurality of mode selective filtered motion signals.

37. An apparatus according to claim 34, wherein the means for generating a plurality of phase estimates comprises:
means for estimating a frequency of a mode selective filtered motion signal of the plurality of mode selective filtered motion signals;
means for generating quadrature first and second reference signals based on the estimated frequency; and
means for generating the plurality of phase estimates from the plurality of mode selective filtered motion signals and the first and second reference signals.

38. An apparatus according to claim 37, wherein the means for generating the plurality of phase estimates from the plurality of mode selective filtered motion signals and the first and second reference signals comprises:
means for multiplying a mode selective filtered motion signal by respective ones of the first and second reference signals to generate respective real and imaginary component signals of the mode selective filtered motion signal; and
means for estimating an arctangent of a quotient of the real and imaginary component signals of the mode selective filtered motion signal to generate a phase estimate.

39. An apparatus according to claim 34, wherein the means for generating a mass flow estimate comprises:
means for generating a plurality of time difference estimates from the plurality of phase estimates; and
means for generating the mass flow estimate from the plurality of time difference estimates.

40. An apparatus according to claim 39, wherein the means for generating a plurality of time difference estimates from the plurality of phase estimates comprises the means for dividing the plurality of phase estimates by a mode frequency to generate a plurality of time difference values.

41. An apparatus according to claim 40, wherein the means for generating a plurality of time difference estimates from the plurality of phase estimates further comprises means for applying a plurality of zero-flow reference time differences to the plurality of time difference values to generate the plurality of time difference estimates.

42. An apparatus according to claim 34, wherein the means for mode selective filtering comprises means for applying a modal transformation to the plurality of motion signals to generate a modal motion signal in a modal coordinate domain, and wherein the apparatus further comprises means for estimating the mode frequency from the modal motion signal.

43. An apparatus according to claim 42, further comprising means for estimating density of material in the conduit from the estimated mode frequency.

44. An apparatus according to claim 40, wherein the means for estimating mass flow from the plurality of time difference estimates comprises:
means for estimating a slope parameter of a scaling function that relates the plurality of time difference estimates to a plurality of reference time differences representing motion of the conduit at a known mass flow; and
means for generating a mass flow estimate from the estimated slope parameter and the known mass flow.

45. An apparatus according to claim 44, wherein the means for estimating a slope parameter comprises means for multiplying the plurality of time difference estimates by a pseudoinverse of the plurality of reference time differences to estimate the slope parameter.

46. An apparatus according to claim 44, wherein the means for estimating a slope parameter comprises:

means for generating an augmented matrix including the plurality of reference time differences; and means for multiplying the plurality of time difference estimates by a pseudoinverse of the augmented matrix to determine the slope parameter.

47. An apparatus according to claim 44, wherein the means for estimating a slope parameter comprises means for iteratively estimating the scaling function.

48. An apparatus according to claim 47, wherein the means for iteratively estimating comprises means for applying a Least Mean Square (LMS) estimation procedure.

49. An apparatus according to claim 44, further comprising means for processing a plurality of motion signals representing motion of the conduit at the known mass flow to generate the plurality of reference time differences.

50. An apparatus according to claim 44, further comprising means for estimating an intercept parameter of the scaling function.

51. An apparatus according to claim 50, further comprising means for determining a system status from the intercept parameter.

52. A computer program product for estimating mass flow of a material in a conduit, the computer program product comprising:

a computer-readable storage medium having computer-readable program code embodied in the computer-readable storage medium, the computer-readable program code comprising:

mass flow estimating computer-readable program code that mode selective filters a plurality of motion signals representing motion of the conduit to generate a plurality of mode selective filtered motion signals such that the mode selective filtered motion signals preferentially represent motion associated with a vibrational mode of the conduit, that generates a plurality of phase estimates from the plurality of mode selective filtered motion signals, and that generates a mass flow estimate from the plurality of phase estimates.

53. A computer program product according to claim 52, wherein the mass flow estimating computer-readable program code generates the plurality of phase estimates using a phase reference derived from one of the plurality of mode selective filtered motion signals.

54. A computer program product according to claim 52, wherein the mass flow estimating computer-readable program code estimates a frequency of a mode selective filtered motion signal of the plurality of mode selective filtered motion signals, generates quadrature first and second reference signals based on the estimated frequency, and generates the plurality of phase estimates from the plurality of mode selective filtered motion signals and the first and second reference signals.

55. A computer program product according to claim 52, wherein the mass flow estimating computer-readable program code generates a plurality of time difference estimates from the plurality of phase estimates and generates the mass flow estimate from the plurality of time difference estimates.

56. A computer program product according to claim 55, wherein the mass-flow estimating computer-readable program code applies a modal transformation to the plurality of motion signals to generate a modal motion signal in a modal coordinate domain, and estimates a mode frequency from the modal motion signal, and generates the plurality of time difference estimates from the plurality of phase estimates using the estimated mode frequency.

57. A computer program product according to claim 56, wherein the computer-readable program code further comprises density estimating computer-readable program code that estimates density of material in the conduit from the estimated mode frequency.

* * * * *

UNITED STATES PATENT AND TRADEMARK OFFICE
CERTIFICATE OF CORRECTION

PATENT NO.    : 6,466,880 B2
DATED         : October 15, 2002
INVENTOR(S)   : Timothy J. Cunningham, David Lee Campbell and Thomas Dean Sharp It is certified that error appears in the above-identified patent and that said Letters Patent is hereby corrected as shown below:

<u>Column 9,</u>
Line 5, replace "vessel, is sampled and digitized by an AID converter 440," with
-- vessel, is sampled and digitized by an A/D converter 440, --

<u>Column 11,</u>
Line 53, replace "estimates $735_1$, $735_2$, ... $735_n$ from respective ones of the" with
-- estimates $735_1$, $735_2$, ..., $735_n$ from respective ones of the --

Signed and Sealed this

Fourth Day of March, 2003

JAMES E. ROGAN
*Director of the United States Patent and Trademark Office*